(12) United States Patent
Ehret

(10) Patent No.: US 8,345,716 B1
(45) Date of Patent: Jan. 1, 2013

(54) POLARIZATION DIVERSE ANTENNA ARRAY ARRANGEMENT

(75) Inventor: Timothy Ehret, Medford, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1219 days.

(21) Appl. No.: 11/823,146

(22) Filed: Jun. 26, 2007

(51) Int. Cl.
*H04J 1/08* (2006.01)

(52) U.S. Cl. .......... 370/537; 370/334; 455/59; 455/132; 455/562.1

(58) Field of Classification Search .................. 370/310, 370/314, 342, 343–345, 441–442, 465–466, 370/498, 499, 503, 507, 508, 534, 535, 537, 370/538, 540, 543–544, 334; 455/59, 101, 455/103, 130, 132, 137, 562.1
See application file for complete search history.

(56) References Cited

U.S. PATENT DOCUMENTS

| | | | |
|---|---|---|---|
| 4,641,107 A | 2/1987 | Kalokitis | |
| 4,780,685 A | 10/1988 | Ferguson | |
| 4,885,590 A | 12/1989 | Hasan | |
| 4,965,530 A | 10/1990 | Katz | |
| 5,017,927 A | 5/1991 | Agrawal et al. | |
| 5,103,233 A | 4/1992 | Gallagher et al. | |
| 5,151,702 A | 9/1992 | Urkowitz | |
| 5,157,403 A | 10/1992 | Urkowitz | |
| 5,309,161 A | 5/1994 | Urkowitz et al. | |
| 5,343,208 A | 8/1994 | Chesley | |
| 5,376,939 A | 12/1994 | Urkowitz | |
| 5,414,428 A | 5/1995 | Gallagher et al. | |
| 5,440,311 A | 8/1995 | Gallagher et al. | |
| 5,481,270 A | 1/1996 | Urkowitz et al. | |
| 5,875,396 A * | 2/1999 | Stockton et al. | 455/562.1 |
| 6,084,540 A | 7/2000 | Yu | |
| 6,177,906 B1 * | 1/2001 | Petrus | 342/378 |
| 6,184,820 B1 | 2/2001 | Kratzer | |
| 6,469,671 B1 | 10/2002 | Pluymers et al. | |
| 6,483,478 B2 * | 11/2002 | Yu et al. | 343/853 |
| 6,570,441 B1 * | 5/2003 | Sasaki | 329/306 |
| 6,639,546 B1 | 10/2003 | Ott et al. | |
| 6,640,110 B1 * | 10/2003 | Shapira et al. | 455/562.1 |
| 6,640,111 B1 * | 10/2003 | Shapira | 455/562.1 |
| 6,697,641 B1 * | 2/2004 | Shapira | 455/562.1 |
| 6,718,184 B1 * | 4/2004 | Aiken et al. | 455/562.1 |
| 6,861,974 B1 | 3/2005 | Poe et al. | |
| 6,995,638 B1 | 2/2006 | Smith et al. | |
| 7,075,412 B1 * | 7/2006 | Reynolds et al. | 340/10.2 |

(Continued)

OTHER PUBLICATIONS

Skolnik, Merril, (of the Naval Research Library), "Attributes of the Ubiquitous Phased Array Radar", published 2003 by the IEEE.

*Primary Examiner* — Michael Thier
*Assistant Examiner* — Curtis A Alia
(74) *Attorney, Agent, or Firm* — Howard IP Law Group, PC

(57) ABSTRACT

An antenna array includes pairs of antenna elements, each responsive to mutually orthogonal first and second polarizations for producing streams of analog signals. The number of transceivers is halved by time-division multiplexing the analog signals onto a single path and transceiving the stream in that path. The transceived analog signals are digitized, to produce streams of digital samples, alternate ones of which represent the first and second polarizations. Alternate samples of the stream of digitized signals represent the analog received first and second polarizations. Simple processing identifies the polarization of the received signals, and can be used for weather evaluation or for polarimetric identification.

13 Claims, 17 Drawing Sheets

U.S. PATENT DOCUMENTS

| | | |
|---|---|---|
| 7,076,201 B2 | 7/2006 | Ammar |
| 7,081,848 B1 | 7/2006 | Adams |
| 7,345,629 B2 | 3/2008 | Dulmovits, Jr. et al. |
| 7,355,547 B2 | 4/2008 | Nakazawa et al. |
| 7,492,313 B1 | 2/2009 | Ehret et al. |
| 7,639,597 B2 * | 12/2009 | Shattil ............................ 370/203 |
| 2001/0045914 A1 * | 11/2001 | Bunker ........................ 343/895 |
| 2002/0030250 A1 | 3/2002 | Ammar |
| 2002/0030269 A1 | 3/2002 | Ammar |
| 2002/0055349 A1 | 5/2002 | Ammar |
| 2002/0055371 A1 * | 5/2002 | Arnon et al. .................. 455/562 |
| 2004/0110469 A1 * | 6/2004 | Judd et al. ....................... 455/15 |
| 2004/0212084 A1 | 10/2004 | Ammar |
| 2005/0221875 A1 * | 10/2005 | Grossman et al. ......... 455/575.7 |
| 2006/0135103 A1 | 6/2006 | Ammar |
| 2007/0249308 A1 * | 10/2007 | Gao et al. ....................... 455/137 |
| 2008/0081566 A1 * | 4/2008 | Rofougaran ................. 455/63.4 |
| 2008/0117097 A1 | 5/2008 | Walter et al. |
| 2008/0237399 A1 * | 10/2008 | Caplin et al. ............... 244/158.4 |
| 2008/0261539 A1 * | 10/2008 | Chen et al. ..................... 455/73 |
| 2010/0060520 A1 * | 3/2010 | Walker et al. ................. 342/361 |
| 2010/0304680 A1 * | 12/2010 | Kuffner et al. ............... 455/63.1 |

\* cited by examiner

FIG. 1
(PRIOR ART)

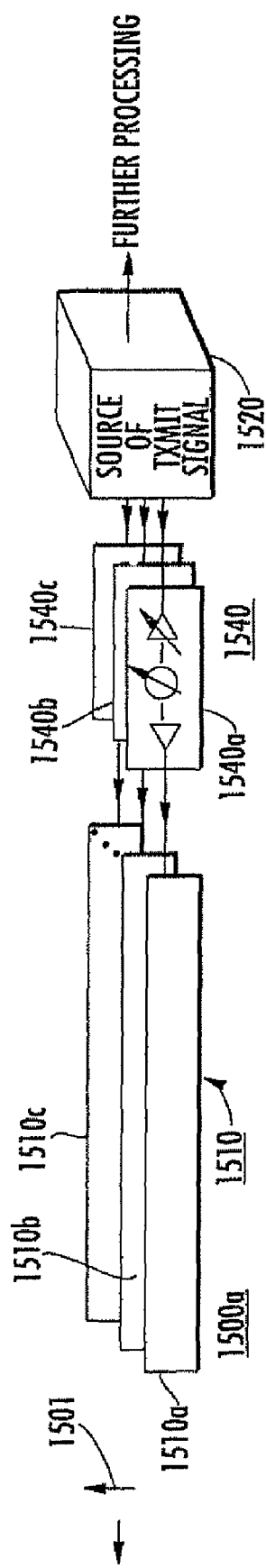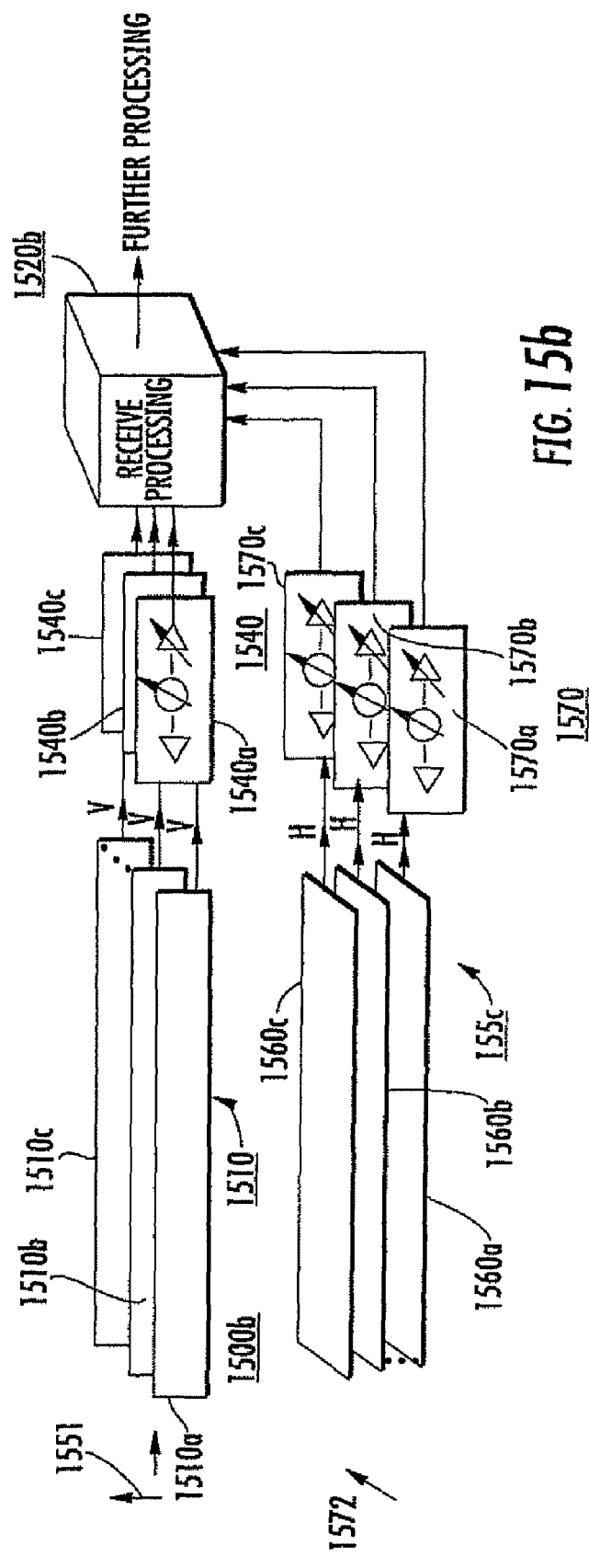
FIG. 15a
FIG. 15b

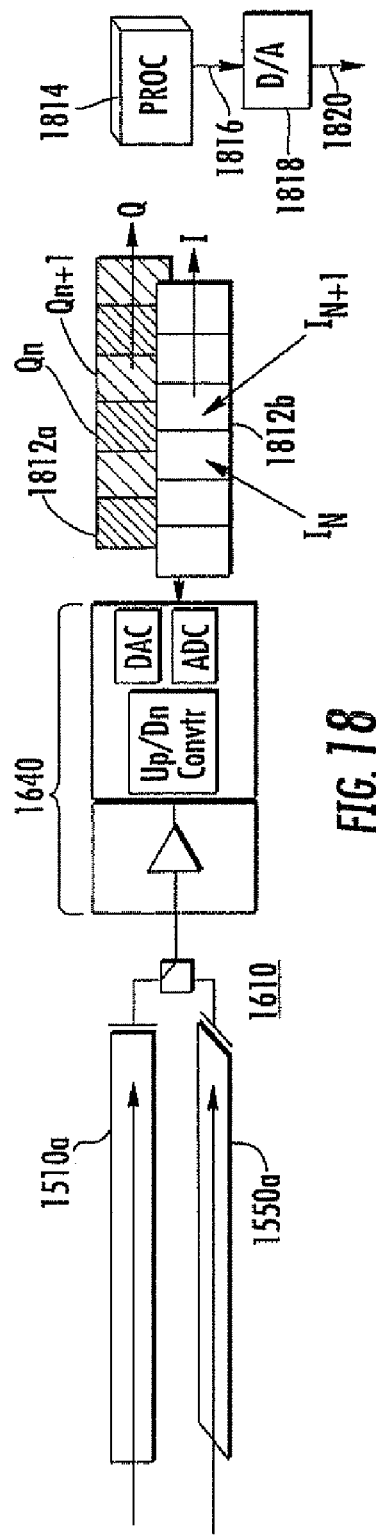

FIG. 18

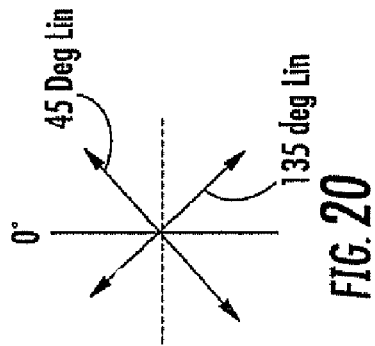

FIG. 20

I CHANNEL SAMPLES n (VERTICAL) AND n+1 (HORIZONTAL) ARE COMBINED IN THE FOLLOWING MANNER

POLARIZED $I_N = K_V * I_N + K_H * E^{j\theta*} * I_{N+1}$

WHERE:
FOR LINEAR POLARIZATION $\varphi$ FROM 0 TO 90 DEGREE
$K_V = \cos(\varphi)$, $K_H = \sin(\varphi)$, $\theta = 0$
FOR LINEAR POLARIZATION $\varphi$ FROM 90° TO 180°
$K_V = \cos(\varphi)$, $K_H = \sin(\varphi)$, $\theta = 180°$
RIGHT HAND CIRCULAR $K_V = 1$ $K_H = 1$, $\theta = +90°$
LEFT HAND CIRCULAR $K_V = 1$, $K_H = 1$, $\theta = -90°$

REPEAT FOR Q CHANNEL

FIG. 19

POLARIZATION DIVERSE ANTENNA ARRAY ARRANGEMENT

FIELD OF THE INVENTION

This invention relates to arrangements for "direct" digital processing of received signals, and more particularly to arrangements for alternating transduction and reception of mutually orthogonal polarization components by use of switching to sample received analog signal at a rate commensurate with the digitizing rate.

BACKGROUND OF THE INVENTION

Those skilled in the arts of antenna arrays and beamformers know that antennas are transducers which transduce electromagnetic energy between unguided- and guided-wave forms. More particularly, the unguided form of electromagnetic energy is that propagating in "free space," while guided electromagnetic energy follows a defined path established by a "transmission line" of some sort. Transmission lines include coaxial cables, rectangular and circular conductive waveguides, dielectric paths, and the like. Antennas are totally reciprocal devices, which have the same beam characteristics in both transmission and reception modes. For historic reasons, the guided-wave port of an antenna is termed a "feed" port, regardless of whether the antenna operates in transmission or reception. The beam characteristics of an antenna are established, in part, by the size of the radiating (or receiving) portions of the antenna relative to the wavelength. Small antennas make for broad or nondirective beams, and large antennas make for small, narrow or directive beams. When more directivity (narrower beamwidth) is desired than can be achieved from a single antenna, several antennas may be grouped together into an "array" and fed together in a phase-controlled manner, to generate the beam characteristics of an antenna larger than that of any single antenna element. The structures which control the apportionment of power to (or from) the antenna elements are termed "beamformers," and a beamformer includes a beam port and a plurality of antenna element ports. In a transmit mode, the signal to be transmitted is applied to the beam port and is distributed by the beamformer to the various element ports. In the receive mode, the unguided electromagnetic signals received by the antenna elements and coupled in guided form to the element ports are combined to produce a beam signal at the beam port of the beamformer. A salient advantage of sophisticated beamformers is that they may include a plurality of beam ports, each of which distributes the electromagnetic energy in such a fashion that different beams may be generated simultaneously.

Radar systems often use multiple antenna beams for tracking of disparate targets, and sometimes for tracking single targets. One scheme for use of multiple beams involves monopulse techniques, in which angle tracking information is obtained from multiple beams, ideally with but a single transmitted pulse. Monopulse operation is accomplished by generating two, or more usually three, antenna beams, so that the simultaneously received echoes from the multiple beams can be compared. The usual monopulse beams are a sum ($\Sigma$) beam, and azimuth (Az) and elevation (El) difference ($\Delta$) beams. Monopulse systems are described in many publications, as for example in U.S. Pat. No. 5,017,927 issued May 21, 1991 in the name of Agrawal et al. Agrawal et al. in one arrangement uses three separate beamformers, namely $\Sigma$, Az $\Delta$, and El $\Delta$ beamformers, to generate the three different beams. These beamformers can be manifested in an array of a plurality of elevation $\Sigma$, Az $\Delta$, and El $\Delta$ column beamformers which connect to the antenna elements, and an array of azimuth $\Sigma$, Az $\Delta$, and El $\Delta$ row beamformers, which connect the $\Sigma$, Az $\Delta$, and El $\Delta$ ports to the column beamformers.

FIG. 1 is a representation of a prior-art array antenna as described in the above-mentioned Agrawal et al. patent. As described therein in FIG. 1, radar system 10 includes an antenna array 12 including individual antennas or antenna elements $14^1$, $14^2$, $14^3$, ... $14^{N-2}$, $14^{N-1}$, and $124^N$ arrayed in a column designated $16^1$. Other columns $16^2$, $16^3$ ... $16^N$ are illustrated in a general manner as being located behind column $16^1$, so as to form a two-dimensional rectangular array of antenna elements.

Each antenna element $14^1$, $14^2$ ... $14^N$ of columns $16^1$, $16^2$, ... $16^N$ of antenna array 12 of FIG. 1 is associated with a phase shifter 18. For example, elemental antenna $14^1$ of column $16^1$ is associated with a phase shifter $18^1$. Similarly, each of the elemental antennas $14^2$, $14^3$ ... $14^N$ of column $16^1$ are associated with a phase shifter $18^2$, $18^3$ ... $18^N$. As also illustrated in FIG. 1, phase shifter $18^1$ has an output transmission line (cable) $20^1$ which, together with output cable $20^N$ of phase shifter $18^N$ of column $16^1$, is connected to a sum-and-difference hybrid circuit $22^1$. Each of cables $20^1$ and $20^N$ is connected to a separate input port (input) of hybrid circuit $22^1$. It will be noted that phase shifters $18^1$ and $18^N$ are associated with elemental antennas $14^1$ and $14^N$, the first and last (top and bottom) antenna elements of column $16^1$. Similarly, the output of phase shifter $18^2$ is coupled by way of a cable $20^2$ to a second sum-and-difference hybrid splitter $22^2$, together with the output from phase shifter $18^{N-1}$, coupled by way of a cable $20^{N-1}$. Phase shifter $18^2$ is associated with antenna element $14^2$, the second antenna element, and phase shifter $18^{N-1}$ is associated with penultimate antenna element $14^{N-2}$. A third sum-and-difference hybrid combining arrangement $22^3$ receives inputs from the third antenna element $14^3$ and its phase shifter $18^3$ by way of cable $20^3$, and from antepenultimate antenna element $14^{N-2}$ and its phase shifter $18^{N-2}$ by way of cable $20^{N-2}$, respectively. It can be seen that the outputs of the antenna elements of column $16^1$ and their phase shifters are taken in pairs symmetrically disposed above and below the center of column $16^1$, and the antenna outputs are combined in an array of sum-and-difference hybrids. The combination or array of sum-and-difference hybrids 22 associated with column $16^1$ is designated $24^1$.

Each of the other columns of FIG. 1, such as column $16^2$, $16^3$ ... $16^N$, includes (not illustrated) its own column array of antenna elements 14 and phase shifters 18, each of which is associated with an antenna 14. Each of the other columns is also associated with an array 24 (not illustrated) of sum-and-difference hybrids 22. Only antenna array column $16^N$ is illustrated in FIG. 1 as being connected by cables 20 to its associated sum-and-difference hybrid array $24^N$.

In the arrangement of FIG. 1, the sum output produced at the upper output of hybrid $22^1$ of hybrid array $24^1$, is coupled by way of a cable $26^1$ to an input of a sum combiner or beamformer $30^1$. Similarly, the upper or sum ($\Sigma$) outputs of sum-and-difference hybrids $22^2$ and $22^3$, and all the other hybrids (not illustrated) of hybrid array $24^1$, are coupled by a cable 26 to sum combiner $30^1$, which combines the sum signals, and which couples the combined sum signals to a single output cable $34^1$. Similarly, the difference ($\Delta$) output ports of sum-and-difference hybrids $22^1$, $22^2$, $22^3$, ... $22^{n/2}$ of hybrid array $24^1$ of FIG. 1 are each connected by way of a transmission line 28 to separate inputs of a difference combiner or beamformer $32^1$. Thus, the $\Delta$ (lower) output port of hybrid $22^1$ is connected by way of a cable $28^1$ to a first input of $\Delta$ combiner $32^1$, the a output port of hybrid $22^2$ is coupled by way of a cable $28^2$ to a second input of Δ combiner $32^1$, and the Δ output port of hybrid $22^3$ is coupled by cable $28^3$ to a third input of Δ combiner $32^1$. All the other hybrids (not illustrated) of hybrid array $24^1$ have their Δ output ports coupled to a Δ combiner $32^1$ in a similar manner. Combiner $32^1$ combines the 'signals and couples their sum to an output cable 36'.

Each of the other hybrid arrays $24^2 \ldots 24^M$ (only $24^M$ illustrated) of FIG. 1 are connected to an associated pair of sum and difference combiners or beamformers in the same manner. The $M^{th}$ hybrid array, namely $24^M$, is illustrated in FIG. 1, together with some of its cables 20, and also with some connection 26 to last column E combiner $30^M$. As so far described, all the columns $16^1$ through $16^M$ ultimately produce a sum signal from a column sum combiner 30 on a cable 34, and a difference signal from a column Δ combiner 32 on a cable 36. Thus, there are M cables 34, and M cables 36, one for each column 16. Elemental phase shifters 18 can be adjusted so that the input signals to column Σ combiners 30 add in-phase for a desired antenna beam pointing direction. Difference signals to column Δ combiner 32 will add in-phase only if cable pairs $26^N$ and $28^N$ are phase matched for all N, provided that the Σ and Δ combiners for each column have identical topologies. First cable $34^1$ and last cable $34^M$ from sum combiners $30^1$ and $30^M$, respectively, are coupled to individual inputs of a sum-and-difference hybrid designated $38^1$. The outputs from the second ($30^2$) and penultimate ($30^{M-1}$) combiners (not illustrated) are coupled over cables $34^2$ and $34^{N-1}$ to separate input ports of a second sum-and-difference hybrid $38^2$. Similarly the third ($30^3$) and antepenultimate ($30^{M-2}$) sum combiners 30 (not illustrated) have their outputs coupled by way of cables $34^3$ and $34^{M-2}$, respectively, to a sum-and-difference hybrid $38^3$. Other sum-and-difference hybrids (not illustrated) together with hybrids $38^1$, $38^2$, and $38^3$, form an array $40^M$ of sum-and-difference hybrids. Each hybrid of array $40^M$ receives inputs from a pair of column sum combiners 30 associated with a pair of columns 16, the columns of which are symmetrically disposed to the left and right of the center of array 12.

The sum outputs of the hybrids of hybrid array $40^M$ of FIG. 1 are each separately coupled by way of a cable 44 to a separate input of an azimuth sum combiner 48. For example, hybrid $38^1$ has its E output connected by way of a cable $44^1$ to an input of azimuth combiner 48, hybrid $38^2$ has its E output connected by a cable $44^2$ to another input of azimuth combiner 48, and hybrid $38^3$ has its Σ output connected by way of a cable $44^3$ to a third input of azimuth sum combiner 48. Azimuth sum combiner combines the Σ signals and produces the combined Σ signal on a cable 50 for application to a processing and display unit illustrated as 70. The Δ outputs of each of sum-and-difference hybrids 38 of hybrid array 40 of FIG. 1 are each separately coupled by way of a cable 46 to separate inputs of an azimuth Δ combiner 52. For example, the Δ output of hybrid 381 is connected by way of a cable $46^1$ to an input of azimuth Δ combiner 52, the Δ output of hybrid $38^2$ is connected to a second input of azimuth Δ combiner 52 by way of a cable $46^2$, and the Δ output of hybrid $38^3$ is connected by way of a cable $46^3$ to yet another input of combiner 52. Combiner 52 combines the Δ signals and applies the combined signals over a cable 54 to processing and display unit 70 of radar unit 10. Another array 41 of sum-and-difference hybrids, each of which is designated as 42 in FIG. 1, is coupled to the array of M column Δ combiners 32 (only combiner $32^1$ is illustrated), in much the same fashion that array 40 of hybrids 38 is coupled to an array of M sum combiners 30. For example, sum-and-difference hybrid $42^1$ receives inputs by way of cables $36^1$ and $36^M$ from first and last column Δ combiners $32^1$ and $32^M$ (not illustrated). Sum-and-difference hybrid $42^2$ is connected by way of cable $36^2$ and $36^{M-1}$ to the second and penultimate column Δ combiner 32 (not illustrated), and hybrid $42^3$ has its inputs connected by way of cables $36^3$ and $36^{M-2}$ to the third and antepenultimate column Δ combiners 32. Other hybrids 42 of array 41 are connected to other pairs of combiners symmetrically disposed to the left and right about the center of array 12.

The sum outputs of each of sum-and-difference hybrids 42 of array 41 of FIG. 1 are coupled by way of separate cables 56 to separate inputs of an elevation Δ combiner 62. For example, hybrid $42^1$ has its sum output connected by way of a cable $56^1$ to a first input of combiner 62, and the sum outputs of hybrids $42^2$ and $42^3$ are connected by separate cables $56^2$ and $56^3$, respectively, to other inputs of elevation Δ combiner 62. Elevation Δ combiner 62 combines the column Δ signals to produce an elevation Δ signal on a cable 64 for application to processing and display unit 70. The difference (Δ) outputs of sum-and-difference hybrids 42 of hybrid array 41 of FIG. 1 are not used and are terminated. For example, the Δ output of hybrid $42^1$ is coupled by way of cable $58^1$ to a termination $60^1$, and the Δ outputs of hybrids $42^2$ and $42^2$ are coupled by cables $58^2$ and $58^3$ to terminations $60^2$ and $60^3$, respectively.

A transmitter 72 associated with radar system 10 of FIG. 1 is coupled to processing and display unit 70 for timing the signals, for providing appropriate demodulation reference signals, and for other purposes. Also, a transmitter signal is applied to cable 50 of azimuth sum combiner 48, as suggested by dotted lines 74 within processing and display unit 70. The transmitter signals are coupled through azimuth combiner 48 and back through the arrays of hybrids and combiners, which in the context of transmission may act as splitters, to ultimately produce signals at antenna elements 14, which signals are phased in a manner appropriate for directing radiation in a particular direction.

The complexity of the beamforming arrangement of FIG. 1 is apparent. Additional complexity arises because of the amplitude weighting of the signals relative to each other in each column 16, and from column to column, in order to achieve the appropriate beam sidelobe levels for both elevation and azimuth beams. Even if phase shifters 18 are set correctly, assuming equal phase signals arriving at the phase shifters, cumulative phase errors through the combiners and hybrid arrays may adversely affect the performance. In this regard, it should be noted that the actual physical lengths of interconnecting cables such as $20^1, 20^2 \ldots 20^M$ must be nearly equal for wide bandwidth signals, and some cables such as $26^N$ and $28^N$ must have the same electrical length as well, even though the distances over which the signals must be carried may be less than the physical lengths. This in turn tends to create a problem relating to excess cable lengths associated with the shorter paths, which excess cable lengths must be stored out of the way.

FIG. 2a is a simplified block diagram of a monopulse antenna array arrangement as described by Agrawal et al. Elements of FIG. 2a corresponding to those of FIG. 1 are designated by the same reference numerals. Array 12 of FIG. 2a includes a plurality of columns $216^1, 216^2, 216^3 \ldots 216^M$, corresponding generally to columns 16 of FIG. 1. Each column 216 of FIG. 2a includes a vertical array of N antenna elements 14, such as $14^1, 14^2, 14^3 \ldots 14^{N-2}, 14^{N-1}$, and $14^N$. Each antenna element 14 of each column 216 is associated with a transmit-receive processor or module (TR Proc). Thus, antenna element $14^1$ of column $216^1$ is associated with a TR Proc $218^1$, elemental antenna $14^2$ is associated with TR Proc $218^2$, and antenna $14^N$ is associated with TR Proc $218^N$. Structurally, all TR Procs 218 are identical, although their adjustable portions (phase shifters, attenuators and/or switches) may be set differently.

As illustrated in FIG. 2a, each transmit-receive processor 218 has three outputs, designated 219, 220, and 221. For simplicity, the outputs of the TR processors are designated by the same reference numerals as that of the cables to which they are attached. Thus, outputs $219^1$, $220^1$ and $221^1$ of TR Proc $218^1$ of column $216^1$ are connected to cables $219^1$, $220^1$ and $221^1$, respectively. In a similar manner, the three outputs of TR Proc $218^2$ of column $216^1$ are connected to cables $219^2$, $220^2$ and $221^2$, respectively. The three outputs of TR Proc $218^N$ of column $216^1$ are separately connected to cables $219^N$, $220^N$ and $221^N$. As illustrated in FIG. 2a, the topmost or first TR processor $218^1$ of column $216^2$ is seen to be associated with output cables $219^1$, $220^1$, and $221^1$. In column $216^M$, TR processor $218^1$ is associated with cables $219^1$, $220^1$, and $221^1$. As in the case of FIG. 1, of course, all the columns $216^2 \ldots 216^N$ are identical to column $216^1$.

The arrangement of FIG. 2a includes a Σ beamformer 230, an azimuth Δ beamformer 229, and an elevation Δ beamformer 231. All the cables 219 connected to TR processors 218 of array 12 are gathered in rows and columns in azimuth Δ beamformer 229. For example, all the cables $219^1$ from TR processors $218^1$ of all M columns 216 are separately connected to separate inputs located along a top row of beamformer 229. Similarly, all the cables $219^2$ from all the M TR processors $218^2$ of all columns 216 of array 12 are gathered and connected to the second row of inputs (not illustrated, in FIG. 2a) of azimuth Δ beamformer 229.

FIG. 2b illustrates the connections of TR processors 218 of FIG. 2a to azimuth Δ beamformer 229 of FIG. 2a. In FIG. 2b, the connection face of beamformer 229 is seen in elevation view, with some of the inputs illustrated as dots. The connection face of beamformer 229 contains MXN input ports, one for each TR Proc 218, laid out as M columns and N rows. As can be seen, the upper row of inputs of beamformer 229 for columns 1, 2, 3 . . . M−2 μM−1, M are each connected to a cable $219^1$. The second row of connections of beamformer 229 is to cables $219^2$, and the bottommost row of connections on the connection face of beamformer 229 receives cables $219^N$.

Sum beamformer 230 of FIG. 2a is connected to receive cables 220 in a same manner in which beamformer 229 is arranged to receive cables 219. That is, the topmost row of the connection face (not illustrated) of sum beamformer 230 is connected to cables $220^1$ from all M columns. The second row is connected to cables $220^2$, and so forth, until the lowermost row is connected to all cables $220^N$ from all M columns. Elevation Δ beamformer 231 is similarly connected to receive cables 221 from all TR Procs 218 of array 12. Azimuth Δ beamformer 229 of FIG. 2a collects all the signals provided over cables 219 to form an azimuth difference signal which is coupled out over a cable 54. In the context of a radar system, cable 54 may be connected to a processor and display unit as described in conjunction with FIG. 1. Similarly, sum beamformer 230 and elevation difference beamformer 231 combine the signals from cables 220 and 221, respectively, to produce combined signals on cables 50 and 64, respectively.

FIG. 3 illustrates one possible arrangement for interconnecting the transmit-receive processors 218 of the arrangement of FIG. 2, as set forth in the Agrawal et al. patent. In FIG. 3, elements corresponding to those of FIGS. 1 and 2 are designated by the same reference numerals. In FIG. 3, only column 216 and a portion of column $216^M$ are illustrated. Each column of the array, including columns $216^1$ and $216^M$, is associated with three individual column beamformers designated 329, 330 and 331. In FIG. 3, azimuth Δ column beamformer $329^1$ is connected to receive cables $219^1$, and all other cables $219^2$, $219^N$ of TR processors $218^2$-$218^N$ of column 216. Column $216^1$ sum beamformer $330^1$ receives inputs from cables $220^1$, $220^2$, $220^2$, . . . $220^{N-2}$, $220^{N-1}$, and $220^N$. Elevation Δ column beamformer $331^1$ is connected to receive cable $221^1$ from TR processor $218^1$ of column $216^1$ and cables $221^2$.. $221^N$ from the remaining TR processors 218 of column $216^1$. Thus, column $216^1$, and all other columns 216 of array 12, is or are associated with three column beamformers, one for sum, one for azimuth Δ and the other for elevation Δ. Thus, cables $220^1$, $220^2$, $220^3$ . . . connect from TR processors $218^1$, $218^2$, $218^3$ of column $216^M$ to sum column beamformer $330^M$. Although not illustrated in FIG. 3, column M azimuth difference beamformer $329^M$ is connected to cables $219^1$, $219^2$ . . . from the TR processors of column $216^M$, and column M elevation Δ beamformer $331^M$ is connected to cables $221^1$, $221^2$ . . . $221^N$ from the TR processors 218 of column $216^M$. Each column beamformer $329^1$-$329^M$ of FIG. 3 produces a signal on an output cable $349^1$-$349^M$. All cables $349^1$ . . . $349^M$ are connected to corresponding inputs of an array azimuth Δ beamformer 339, which combines the column signals to produce an array azimuth Δ signal on a cable 54. Similarly, elevation Δ column beamformers $331^1$ . . . $331^M$ each produce a combined output on a corresponding cable $351^1$ . . . $351^M$, which are all connected to an array elevation Δ beamformer 341, which combines the signals to produce a combined elevation Δ signal on cable 64. Finally, each sum column beamformer 330 . . . $330^M$ combines its signals to produce a combined signal on a corresponding cable $350^1$ . . . $350^M$. All cables $350^1$ . . . $350^M$ are connected to corresponding inputs of an array sum beamformer 340, which combines the signals to produce a combined sum signal on a cable 50. Array Σ beamformer 340 of FIG. 3, together with M associated column Σ beamformers 330, may be considered equivalent to sum beamformer 230 of FIG. 2a. Similarly, AZ Δ beamformer 229 of FIG. 2a corresponds to the combination of azimuth Δ beamformer 339 of FIG. 3 with a plurality equal to M of column AZ Δ beamformers 329. Elevation Δ beamformer 231 of FIG. 2a corresponds to the combination of elevation Δ beamformer 341 of FIG. 3 with all M of the column EL Δ beamformers 331.

FIG. 4 is a simplified block diagram of a transmit-receive processor 218 which may be used in the arrangements of FIG. 2 or 3. Elements of FIG. 4 corresponding to those of FIGS. 2 and 3 are designated by the same reference numerals. A port 410 at the right of FIG. 4 is available for connection to the associated antenna element 14. A transmit amplifier designated generally as 412 includes a power amplifier illustrated as 414 and a driver amplifier 416. Broadcasting of harmonics of the transmitted signal is reduced by a harmonic filter 418. Also in FIG. 4, a receive amplifier arrangement designated generally as 420 includes a low noise amplifier (LNA) 422 preceded by an amplitude limiter 424. Transmitted signals are transmitted from transmit amplifier 412 to port 410, and to the associated antenna element 14 (not illustrated) by way of a circulator 426, and signals received by the antenna element are coupled from port 410 to receive amplifier arrangement 420, also by way of circulator 426, which provides isolation between transmit amplifier arrangement 412 and receive amplifier arrangement 420. A phase shifter 428 has its output connected to a variable gain amplifier 430, which may be used to compensate for changes in the loss of the phase shifter when the phase shifter is controlled to assume various values of phase shift. A switching arrangement designated generally as 431 includes a first switch 432 including a common element illustrated as 434, and also including switch terminals 436 and 438. Mechanical switch symbols are used for purposes of explanation, but those skilled in the art know that solid-state equivalents may provide performance which may be superior. Common element 434 of switch 432 is connected to a port 220, which is the port which is connected to the sum combiners in the arrangements of FIGS. 2 and 3. Switching arrangement 431 includes a second switch 440, which has a common element connected to the output of variable gain amplifier 430, and switch terminals 442 and 444. Switch terminal 442 is connected to the input port of transmit driver 416. A receive post amplifier 447 is connected between switch terminal 444 of switch 440 and switch terminal 436 of switch 432. A third switch 446 of switching arrangement 431 includes a common element connected to the input port of phase shifter 428, a switch terminal connected to switch terminal 438 of switch 432, and a further terminal 448.

A coupling arrangement designated generally as 450 in FIG. 4 includes a one-to-N power divider 452, the input of which is coupled to the output of low noise amplifier 422, for dividing the amplified received signal into a plurality of portions. As illustrated in FIG. 4, the number of portions is three. A first portion is coupled by way of a path 454 to switch terminal 448 of switch 446. The other portions are described below. Each module 218 is also associated with or contains power conditioning and switching circuits illustrated as 456, and logic circuits illustrated as including an application-specific IC 458 controlled by external commands received from a port 460. Application-specific IC 458 addresses a programmable ROM (PROM) portion 461 of the logic circuit to generate commands for a control driver 462. Control driver 462 in turn commands the operation of switches 432, 440 and 446, the value of the phase shift provided by phase shifter 428, the magnitude of gain provided by variable gain amplifier 430, and other appropriate variable elements (not illustrated).

As so far described, the arrangement of FIG. 4, with the switches in the illustrated positions, is arranged to receive signals to be transmitted at input port 220, to pass those transmitted signals through the selected value of phase shift in phase shifter 428, and to apply the phase shifted signals to transmit amplifier arrangement 412 for amplification and for application through filter 418 and circulator 426 to the associated antenna element 14. The magnitude of the phase shift is selected by control arrangements associated with the control of the entire array, of which a particular module 218 is only a part. With switches 432, 440, and 446 of FIG. 4 in their alternate positions (not illustrated), signals received by antenna element 14 are coupled by way of port 410 and circulator 426 to limiter 424 and receive amplifier arrangement 420. Amplified received signals are coupled by way of power divider 452 and path 454, through switch 448 to the input of phase shifter 428, where they are phase shifted by the same phase shifter which provided phase shifting in the case of the transmit mode of operation. The phase shifted signals are again attenuated, and coupled by way of switch 440 (in its alternate position), through receive post amplifier 447 and, by way of switch 432 (in its alternate position), to port 220 for transmission therefrom to the sum combiner. This arrangement has the distinct advantage of using the combiner, phase shifter 428, and variable gain amplifier 430 for both transmit and receive operations.

According to a further aspect of the Agrawal et al. arrangement, the signals coupled to other beamformers, such as azimuth Δ beamformer 229 and elevation Δ beamformer 231 of FIG. 2a, are phase shifted by additional controllable phase shifters independent of phase shifter 428, which is used exclusively for the sum combiner or the sum beamformer. Thus, the value of phase shift provided by phase shifter 428 of FIG. 4 need not be a compromise. In the arrangement of FIG. 4, coupling arrangement 450 includes a further path designated generally as 464 between an output 465 of power divider 452 and a port 219. Path 464 includes a controllable phase shifter 466, a variable gain amplifier 468 and a further receive post amp 470. Variable gain amplifier 468 sets elemental gain for the desired array amplitude taper and resulting side lobe performance, and compensates for amplitude errors attributable to phase shifter 466. Port 219 is connected to the azimuth difference beamformer in the arrangement of FIG. 2. Coupling arrangement 450 also includes a further path designated generally as 472 between another output port 473 of power divider 452 and an output port 221. Path 472 includes a controllable phase shifter 474, an associated variable gain amplifier 476, and a further receive post amp 478. The output of post amplifier 478 is connected to output port 221. Coupling path 450 may include further paths connected to further output ports of power divider 452 for separately phase shifting and level setting signals intended for beamformers associated with monopulse beams other than Σ, AZΔ and ELΔ. Such additional paths are suggested by line 480 connected to an output port 479 of power divider 452.

As so far described, the arrangement of FIG. 2 using a TR module as illustrated and as described in conjunction with FIG. 4 has the salient advantage that the beamformers are not critical, and need not have connections thereto made in matched pairs equidistant from the center lines of the array. Thus, there may be a great saving in cable length and weight, and a reduction in the criticality of the phase through the various paths. Because the system can be tested, the phase shifts of the phase shifters of each TR module can be adjusted to optimize the phase shift through the particular path connected to that output port of that module. The performance in either transmission or reception can therefore be optimized separately for each of the Σ, AZΔ and ElΔ beams, and for any other monopulse beams. Within the beamformers, sums of nearby subarray signals can be made in any order, thereby providing a significant saving in the length and weight of cables. For the difference beams, an extra 180° phase shift can be added to the elemental outputs from selected half arrays. The variable gain amplifiers can be adjusted not only to correct amplitude errors within the beamformer but can provide the amplitude taper required to reduce the sidelobe level. The beamformers can be designed using standardized coupling values rather than coupling values which are customized to provide the desired amplitude weighting. At each operating frequency of the array, the phase shifters and variable gain amplifiers can be programmed with the phase and amplitude required to correct the errors which occur at that particular frequency, thus providing improved antenna performance over that achievable with prior art arrangements. Accordingly, the limiting factor in the performance of such an array is the ability to measure errors, together with the long-term stability of the equipment.

A disadvantage of the arrangement described in conjunction with FIGS. 2, 3 and 4 lies in a number of phase shifters and the complex control which may be required therefor. A compromise between the prior-art arrangement of a single phase shifter for multiple beamformers and the arrangement of FIGS. 2 through 4, having a single phase shifter for each beamformer of the array, may be the use of two phase shifters for three beamformers. FIG. 5 illustrates portions of the arrangement of FIG. 4, with a coupling circuit 450 which provides only a single additional phase shifter. Elements of FIG. 5 corresponding to those of FIG. 4 are designated by the same reference numerals. FIG. 5 differs from FIG. 4 in that low noise amplifier 422 has its output coupled to a two-way power divider 552. One output of power divider 552 is coupled to the cascade of a variable gain amplifier 530 and a controllable phase shifter 528. The output of the cascade is connected to an output port 519 and is available to the difference beamformers. A second output of power divider 552 is coupled by way of a path 554 to terminal 448 of switch 446. This provides a path by which received signals can return to the sum beamformer, as described in conjunction with FIG. 4.

FIG. 6 is a simplified block diagram of an array antenna using two-output TR Proc modules such as those of FIG. 5. Elements of FIG. 6 corresponding to those of other FIGURES are designated by the same reference numerals. In FIG. 6, array 12 includes a plurality of elemental antennas 14, each coupled to the radiator port of an associated TR Proc 518, each of which is similar to that of FIG. 5. The TR Procs 518 are arranged in columns designated $616^1$, $616^2$, ..., $616^M$. Each column includes N TR Procs 518. The R processors 518 of FIG. 6 differ from those of FIG. 3 in having only two outputs. The lowermost output 519 from each TR processor 518 is coupled to an elevation difference beamformer illustrated in FIG. 6 as 231. This beamformer is similar to beamformer 231 of FIG. 2a, which combines the Δ El signals from N×M TR Procs 518 to produce a combined ΔEl signal on a conductor 64, and may be implemented in the form illustrated in FIG. 3.

The uppermost or Σ outputs from each TR Proc $518^1$, $518^2$, ..., $518^M$ of column $616^1$ of FIG. 6 are connected to inputs of a Σ column beamformer $330^1$, corresponding to a beamformer of FIG. 3. Beamformer $330^1$ combines the Σ outputs from the TR Procs of column $616^1$ and produces a combined signal on a cable $350^1$. The uppermost Σ outputs of the TR processors (not illustrated) of columns $616^2$, $616^3$, ... $616^M$ are each collected by a corresponding Σ beamformer $330^2$, $330^3$, ..., $330^M$, to produce outputs on cables $350^2$, $350^3$, ..., $350^M$. As so far described, the arrangement is generally similar to that of FIG. 3, but there is only a single output cable from each column Σ beamformer. These single cables carry signals from which both the Σ and Δ azimuth beams must be generated. The desired pair of beams are generated from the signal on the single cables by applying the signals on cables $350^1$, $350^2$, ..., $350^M$ of FIG. 6 to a further array 618 of TR Procs 518. As illustrated in FIG. 6, array 618 includes TR Procs $518^1$, $518^2$, $518^3$, ..., $518^M$. TR Proc 518 of array 618 may be identical to TR Procs 518 of columns 616. Each TR Proc receives signals from a corresponding cable 350, for, in a receiving mode, dividing the signals into two portions and applying them to a sum beamformer 340 and to a Δ azimuth beamformer 339. This arrangement has the advantage of relative simplicity compared with the arrangement of FIG. 3, while maintaining the advantage of substantial control over the three antenna patterns.

In FIG. 7, elements corresponding to those of other FIGURES are designated by the same reference numerals. The arrangement of FIG. 7 is generally similar to that of FIG. 6, but includes the use of power dividers for feeding pairs of beamformers in order to generate closely-spaced beam pairs which track with changes in a single phase shifter. The arrangement of FIG. 7 includes a plurality of vertical column arrays 716, each of which includes a plurality of elemental antennas 14, a like plurality of TR processors 518, and a pair of power dividers or splitters $710^A$, $710^B$ for each TR processor. Thus, each antenna 14 produces four output signals. For example, the first vertical column array $716^1$ of FIG. 7, which is the only array illustrated in any detail, includes antennas $14^1$, $14^2$, $14^3$, ..., $14^N$. Taking antenna $14^1$ as being typical, it is connected to the input of a TR processor $518^1$. TR Proc $518^1$ is connected to a first output cable $620^1$ and a second output cable $519^1$. Cable $620^1$ is applied to the input of a power divider illustrated as a block $710^{1a}$, while cable $519^1$ is applied to a second power divider $710^{1b}$. Power divider $710^{1a}$ divides the signal received over its input cable $620^1$ into two portions, one of which is coupled onto a cable $712^1$, and another portion which is coupled onto a second cable $714^1$. Similarly, signal coupled into power divider $710^{1b}$ from cable $519^1$ is divided into two portions, the first of which is coupled on to a first cable $716^1$ and the second of which is coupled onto a second cable $718^1$. All the other connections within column array 716 are similar and are not discussed in detail. The three lower cables from each power divider set are individually coupled to three beamformers 731, 732 and 733. In particular, cable $714^1$ from power divider $710^{1a}$ is connected to a beamformer 733 by a path (not illustrated), and the cables 714 from all the other elements of each column array 716 are coupled separately to an input of beamformer 733. The output of beamformer 733 appears on a cable $750^5$. Similarly, all cables 716 from all power dividers $710^b$ are coupled to a beamformer 732, which has an output cable $750^6$ and all cables 718 from power dividers $710^b$ of all column arrays 716 are coupled to a further beamformer 731, which has an output cable $750^7$; it should be noted that the signal applied over cables 716 to beamformer 732 and those applied over cable 718 to beamformer 731 have the same amplitude and phase, since they are replicas of one another. According to the aspect of the embodiment of Agrawal et al., a relative progressive phase shift is provided to the inputs of one of beamformers 731 and 732 so as to slightly offset the beams which they generate. With these slight phase offsets, which may be provided by printed line length differences built into the beamformers, two separate beams are generated, which track together during beam steering under the control of a single one of the phase shifters within each of the TR processors 518 of the column arrays 716. Similarly, a relative progressive phase shift is provided between the inputs of beamformers 732 and 733, to generate yet another beam pair.

Output cables 712 of power dividers $710^a$ are separately connected to inputs of column sum beamformers illustrated as 330 in FIG. 7. Thus, cables $712^1$, $712^2$, $712^3$, ..., $712^N$ of column $716^1$ are connected to separate inputs of sum beamformer $330^1$. Corresponding cables of column arrays $716^2$ are similarly coupled to a column beamformer $330^2$, etc. Each column beamformer $330^1$, $330^2$, ..., $330^M$ sums the signals applied thereto and couples them onto a single output cable 750. For example, sum beamformer $330^1$ sums signals onto a single cable $750^1$. The combined signal produced at each cable 750 is coupled to an input of an associated TR processor 518 of an array 718. Each TR processor of array 718 generates two output signals. Each array 718 also includes a further pair of power dividers $710^a$ and $710^b$ connected to the outputs of each TR processor. Thus, the combined signal produced on each cable 750 generates four outputs. Each power divider $710^a$ of array 718 produces an output on a first output cable 790 and on a second cable 792. For example, power divider $710^{1a}$ divides the signal applied to its input port into two portions, a first of which is coupled onto output cable $790^1$, and the other portion of which is coupled to output cable $792^1$. Similarly, the signals coupled into power divider $710^{1b}$ are divided into two portions, the first of which is coupled onto cable $794^1$, and a second of which is coupled onto cable $796^1$. All cables 790 are coupled separately to separate inputs of a first sum beamformer $740^1$, all cables 792 are coupled separately to separate inputs of a second sum beamformer $740^2$, all cables 794 are coupled separately to inputs of a further sum beamformer $740^3$, and all cables 796 are coupled separately to separate inputs of a beamformer $740^4$. Each beamformer 740 sums together its input signals and couples them to a single output cable. For example, sum beamformer $740^1$ couples its output on to a cable $750^1$, beamformer $740^2$ couples its output to cable $750^2$, sum beamformer $740^3$ couples its output on to a single cable $750^3$, and sum beamformer $740^4$ couples its output on to a single cable $750^4$.

In operation of the arrangement of FIG. 7, beamformers $740^1$ and $740^2$ receive inputs which are common in amplitude and phase. Beamformers $740^1$ and $740^2$ are provided with a relative progressive phase shift of their inputs so that the beams which they form are angularly spaced by a small angle. Similarly, the inputs of beamformers $740^3$ and $740^4$ are provided with a relative phase shift so that they produce slightly different angular spacing of their beams. These angular spacings track during scanning, because the scanning is controlled by the same phase shifter of the phase shifters 518 of array 718 or of the arrays 716. It should also be noted that there may be a progressive phase shift between the inputs of all beamformers 740 and beamformers 731, 732 and 733.

FIG. 8 illustrates a beam pattern which might be generated by an arrangement such as that of FIG. 7. In FIG. 8, seven separate beams from outputs $750^1$, $750^2$, $750^3$, $750^4$, $750^5$, $750^6$, and $750^7$ are respectively represented by circles 810, 812, 814, 816, 818, 820 and 822. These circles may be considered, for example, to represent a plot of the 1.0 dB beam width points of the antenna pattern. As illustrated in FIG. 8, adjacent pairs of circles, or beams, are considered to scan together, with the central position of each pair being separately steered. As noted by Agrawal et al., various forms of signal processing may be performed on the formed beams for noise reduction, target enhancement and the like, before display, but are beyond the scope of the description. Agrawal et al. also note that other embodiments of the arrangements of Agrawal et al. will be apparent to those skilled in the art. For example, beamformers 231 in FIG. 6 and/or 731, 732 and/or 733 in FIG. 7 can be designed like those in FIG. 3, where some of the combining is done within the array columns and the balance is done with a one dimensional horizontal beamformer for each of the desired beams. As another example, arrays of antennas may have shapes which are other than rectangular, as for example circular, in which case it may be desirable to interpret the terms "column" and "row", as used hereinbefore, as "ring" and "radial", respectively, while other shapes may require other interpretations. It should be noted that even circular arrays may have the elemental antennas arranged in rows and columns. The transmission lines interconnecting the various portions of the described system may be formed as coaxial cables, or as printed circuit transmission lines, or as waveguides, or as separate conductors, depending upon the application. Parallel digital signals may be carried by multiconductor transmission lines, all in known fashion. While TR processors 518 of array 618 of FIG. 6 or array 718 of FIG. 7 have been described as being identical to TR processors 518 of column arrays 616 of FIG. 6 or 716 of FIG. 7, they need not be totally identical, specifically in terms of gain and output power.

The radar system as described in the Agrawal et al patent can be of any polarization, such as linear "vertical" or "horizontal," or right or left "circular." Those skilled in the art know that the terms "vertical" and "horizontal" are often applied to identify mutually orthogonal linear polarizations, regardless of the actual orientation of the electric field. Similarly, those skilled in the art know that true circular polarization is only a goal, and the best that can be achieved in practice is elliptical. Some radar systems applications, such as weather radar, require transmission of a linearly polarized signal, and simultaneous determination of the polarization characteristics of the return signal. The simultaneous determination of the polarization characteristics of the return signal, in turn, requires simultaneous measurement of two mutually orthogonal return or receive signals. In order to receive and process first and second mutually orthogonal "components" of the return signal, the radar system must include an array of antenna elements responsive to the first of the two polarization components, and another array of antenna elements responsive to the second polarization component, orthogonal to the first. The antenna elements of each of these differently responsive arrays may be co-located (in as much as possible) so that the antenna aperture is not doubled, but each of the two differently responsive receive arrays must have its own beamformers. It will be appreciated that the complexity and cost of providing capability for polarization discrimination will be substantial.

Improved or alternative polarization responsive receive array arrangements are desired.

SUMMARY OF THE INVENTION

A method according to an aspect of the invention is for receiving polarized electromagnetic signals. The method comprises the steps of transducing two components of the received signal to produce first and second streams of analog signals-representing mutually orthogonal polarizations of the electromagnetic signals. The first and second streams of analog signals are multiplexed onto a path, to produce multiplexed, interleaved, or alternating analog signals. The multiplexed analog signals are converted from analog to digital form at a sample rate sufficient to allow reconstruction of the original analog signals to thereby generate digital received signals in which first digital samples representing the first analog signal alternate with second digital samples representing the second analog signal. The first and second digital samples of the first and second analog signals, respectively, are processed to produce a digital representation of the analog electromagnetic signals, including polarization information.

A method according to another aspect of the invention is for receiving polarized electromagnetic signals, and comprises the steps of transducing components of the received electromagnetic signal to produce first and second streams of analog signals representing mutually orthogonal polarizations of the electromagnetic signal. The first and second streams of analog signals are multiplexed onto a path, to thereby produce multiplexed, alternating or time-interleaved polarization analog signal samples. The multiplexed analog signals are converted to digital form at a sample rate sufficient to reconstruct the original analog signals, to thereby generate digital received signals in which first digital samples representing the first analog signal alternate with second digital samples representing the second analog signal. The first and second digital samples are processed to generate digital signals representing a selected polarization different from the first and second polarizations.

A method according to another aspect of the invention is for determining the polarization of an electromagnetic signal, and comprises the steps of transducing the electromagnetic signal with a first antenna element responsive to a first polarization, to thereby generate a first component of received signal, and transducing the electromagnetic signal with a second antenna element responsive to a second polarization, to thereby generate a second component of received signal. The first and second components of received signal are multiplexed at a multiplexing rate onto a common path to thereby generate multiplexed analog received signals. The multiplexed analog received signals in the common path are at least downconverted, to thereby generate processed multiplexed analog received signals. The processed multiplexed analog received signals are converted to digital form at a rate related to the multiplexing rate, so that each of first and second components of the multiplexed analog received signals is represented by a digital sample. The digital samples are processed to determine the polarization of the electromagnetic signal. In this aspect of the method of the invention, the multiplexing step may comprise the step of alternately multiplexing to generate alternating analog samples representing the first and second components of the received signal. Also in this aspect of the method of the invention, the step of converting the processed multiplexed analog received signals to digital form at a rate related to the multiplexing rate includes the step of converting the processed multiplexed analog received signals to digital form at the multiplexing rate.

BRIEF DESCRIPTION OF THE DRAWING

FIG. 1 is a representation of a prior-art array antenna as described in U.S. Pat. No. 5,017,927 to Agrawal et al.;

FIG. 2b illustrates connections of FIG. 2a;

FIG. 15a is a representation of an arrangement for transmitting linear polarization from an array using the principles discussed in conjunction with FIG. 11, and FIG. 15b applies the principles of FIG. 11 to reception of two orthogonally polarized signals;

FIG. 12 is a diagram illustrating the application of principles described in conjunction with FIG. 11b to another embodiment of the invention with advantageously reduced hardware complement; and FIG. 13 is a more detailed diagram illustrating implementation of the principles of FIG. 12 to the arrangement of FIG. 11;

FIG. 14 is a plan view of a portion of an array of planar antenna elements, each of which is capable of transducing mutually orthogonal electromagnetic signal or field components;

FIG. 15a is a highly simplified diagram representing a structure used in a transmit part or portion of a method for providing polarization diversity upon reception using element level digital technology corresponding to that of the Ehret and McGroary application, and FIG. 15b is an equivalent structure useful for reception;

FIG. 18 illustrates a simplified arrangement according to an aspect of the invention for reception and processing of I and Q signals and for determining the polarization of the original signal or for generating an arbitrary polarization from the signals;

FIG. 19 sets out some of the equations for performing steps associated with an aspect of the invention; and FIG. 20 illustrates a plane in which electromagnetic polarizations may be represented.

DESCRIPTION OF THE INVENTION

Figure 9:
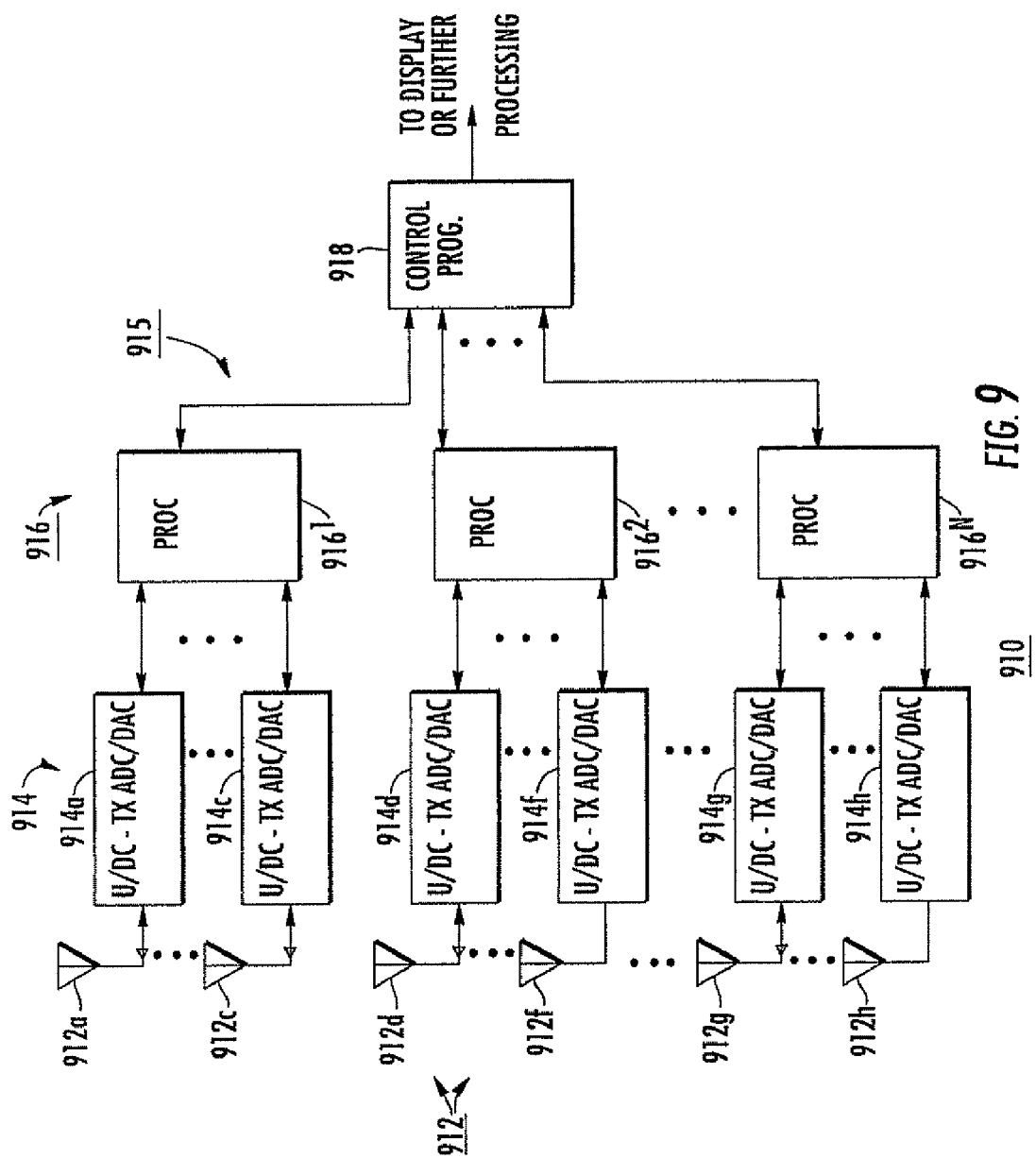
FIG. 9 is a simplified block diagram of a radar system 910 as described in U.S. patent application Ser. No. 11/590,402, filed Oct. 31, 2006 in the name of Ehret and McGroary, and entitled 'Digital Processing Radar System'.
Figure 8:
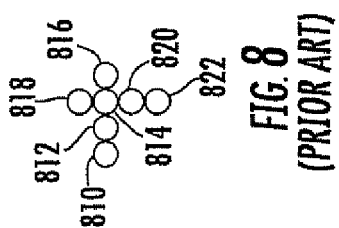
FIG. 8 illustrates a beam pattern which might be generated by an arrangement such as that of FIG. 7.

FIG. 9 is a simplified block diagram of a radar system 910 as described in U.S. patent application Ser. No. 11/590,402, filed Oct. 31, 2006 in the name of Ehret and McGroary, and entitled 'Digital Processing Radar System'. In FIG. 9, a set 912 of antenna elements includes plurality of elemental antennas 912a . . . 912c, 912d . . . 912f, 912g . . . 912h arranged in an antenna array. Each of antenna elements 912a . . . 912c, 912d . . . 912f, 912g . . . 912h is connected by an analog signal path to an associated one of a set 914 of up/downconverter-transceiver ADC/DACs (U/DC-Tx ADC/DACs) 914a, . . . , 914c, 914d . . . , 914f, 914g . . . , 914h. Each (U/DC-Tx ADC/DAC) of set 914 is in analog communication with the associated elemental antenna of set 912 of antennas, and in digital communication with an associated digital processor. As illustrated in FIG. 9, U/DC-Tx ADC/DACs 914a, . . . , 914c communicate with a processor $916_1$ of a set 916 of digital processors, U/DC-Tx ADC/DACs 914d, . . . , 914f communicate digitally with a processor $916_2$, and U/DC-Tx ADC/DACs 914g, . . . , 914h communicate digitally with a processor $916_N$. Each of the processors of set 916 communicates digitally with a command processor 918.

Figure 10:
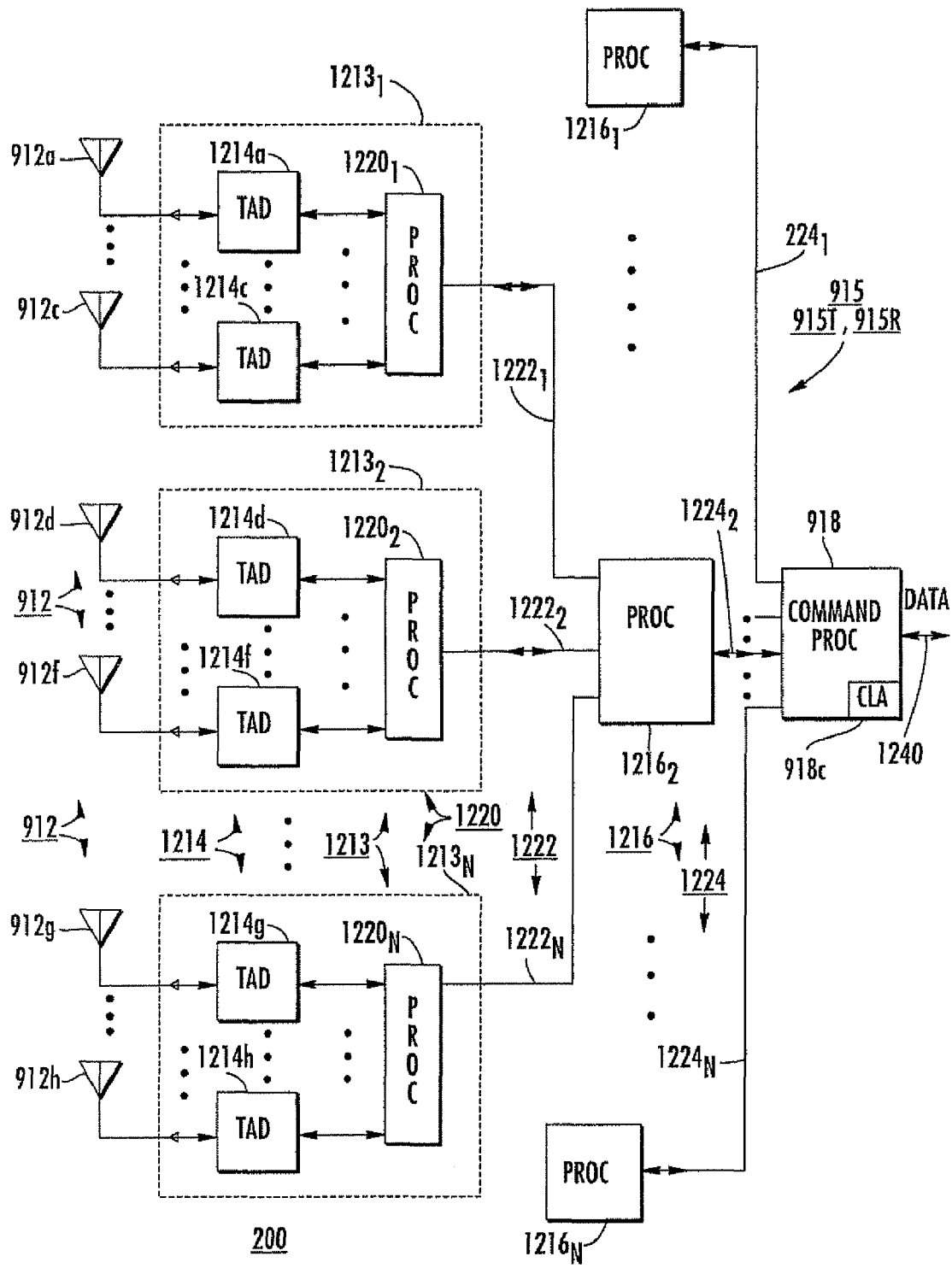
FIG. 10 is a simplified block diagram of another system described in the Ehret and McGroary Patent application.

Command processor 918 of FIG. 9 determines or establishes the various parameters or characteristics of the radar signal to be transmitted, such as the timing, carrier frequency, pulse width, pulse length, pulse coding, sidelobe level, steering angle, number of beams, and the like. The digital command signals are transmitted from processor 918 to the various processors of set 916, namely processors $916_1$, $916_2$, . . . , $916_N$. Each processor of set 916 of processors receives the command signals and in response generates digital signals which represent the analog signal to be transmitted from each elemental antenna of set 912 of antennas. That is, the digital signals produced by processors of set 914 of processors are digital equivalents of the baseband analog signals to be transmitted from the various elemental antennas of set 912 with which the processors are associated. Thus, processor $916_1$ produces a plurality of individual digital signals, the bits of which represent at least the amplitude and relative phase of the analog signal to be transmitted from the corresponding elemental antennas. The transmit frequency is selected by the control processor 918, and a control signal is sent to each of the U/DC-Tx units of set 914, to command U/D conversion using that RF center frequency. If appropriate, the bits of the digital signal may also directly contain the frequency of the analog signal to be transmitted. It will be clear that the number of digital processors in set 916 of processors depends upon various factors which determine the computational load on the processors and the capabilities of the processors. In principle, all the processors of set 916 and processor 918 can be subsumed into a single processor, which is designated generally as 915. For many applications, more than one processor may be required. Thus, processor 915 as illustrated in FIG. 9 includes portions 915T for controlling transmit functions, and portions 915R for controlling receive functions and processing receive signals, as illustrated in FIG. 10.

In the arrangement of FIG. 9, the digital signals produced by the various processors of set 916 of processors are applied to up/downconverter-transceiver ADC/DACs (U/DC-Tx ADC/DACs) 914a, ..., 914c, 914d ..., 914f, 914g ..., 914h. That is, each digital signal representing one analog signal to be transmitted by the radar set 910 is applied to one U/DC-Tx ADC/DAC of set 914. For example, a digital signal representing the analog signal to be transmitted by elemental antenna 912a is applied from processor $916_1$ to U/DC-Tx ADC/DAC 914a. U/DC-Tx ADC/DAC 914a converts the digital signal to analog, and upconverts the resulting analog signal to the desired operating frequency by means of a transceiver (not illustrated in FIG. 9). The upconverted analog signal is applied to antenna element 912a. Similarly, U/DC-Tx ADC/DAC 914c converts to analog form the digital signal from processor $916_1$, and upconverts the resulting analog signal to the desired operating frequency by means of a transceiver. The upconverted analog signal is applied from U/DC-Tx ADC/DAC 914c to elemental antenna 912c. Likewise, a digital signal representing the analog signal to be transmitted by elemental antenna 912d is applied from processor $916_2$ to U/DC-Tx ADC/DAC 914d. U/DC-Tx ADC/DAC 914d converts the digital signal to analog, and upconverts the resulting analog signal to the desired operating frequency by means of a transceiver. The upconverted analog signal produced by U/DC-Tx ADC/DAC 914d is applied to elemental antenna 912d. Similarly, U/DC-Tx ADC/DAC 914f converts the digital signal from processor $916_2$ to analog form, and upconverts the resulting analog signal to the desired operating frequency by means of a transceiver. The upconverted analog signal is applied from U/DC-Tx ADC/DAC 914f to elemental antenna 912f. For completeness, a digital signal representing the analog signal to be transmitted by elemental antenna 912g is applied from processor $916_3$ to U/DC-Tx ADC/DAC 914g. U/DC-Tx ADC/DAC 914g converts the digital signal to analog, and upconverts the resulting analog signal to the desired operating frequency by means of a transceiver. The upconverted analog signal produced by U/DC-Tx ADC/DAC 914g is applied to elemental antenna 912g. Similarly, U/DC-Tx ADC/DAC 914h converts the digital signal from processor $916_3$ to analog, and upconverts the resulting analog signal to the desired operating frequency by means of a transceiver. The upconverted analog signal is applied from U/DC-Tx ADC/DAC 914h to elemental antenna 912h.

Thus, in a transmit mode of operation, the radar system 910 of FIG. 9 transmits from each elemental antenna of an antenna array 912 analog signals controllable in amplitude, frequency, relative phase, and modulation characteristics under control of generalized processor 915. By selecting the characteristics of the underlying digital signals to represent plural beams, multiple instantaneous transmit beams can be generated.

In a receive mode of operation of the arrangement of FIG. 9, return or reflected signals from one or more targets (not illustrated) are received at each elemental antenna of set 912 of antennas. The received signals are downconverted in the associated U/DC-Tx ADC/DAC of set 914 of U/DC-Tx ADC/DACs, to thereby generate baseband or possibly intermediate-frequency (IF) signals. The baseband or IF signals are converted into digital form, conserving the amplitude and phase information. The digital data generated by each U/DC-Tx ADC/DAC, representing the analog signal received at the corresponding elemental antenna of set 912 of antennas, is or are applied to the associated processor of set 916 of processors. The individual processors of set 916 of processors process the data to define the various receive beams selected by command processor 918, and to extract the return information from a subarray of antenna elements. Thus, the information extracted by U/DC-Tx ADC/DACs 914a, ..., 914c from the return signals received by antenna subarray 912a, ..., 912c is processed by processor $916_1$ to produce a portion of the target information. The extracted subarray data from processor $916_1$ is combined with subarray data from other antenna subarrays in control processor 918, which produces data for display or further processing. Thus, the receive signal processing is performed by generalized processor 915. Multiple simultaneous receive beams are advantageous, as noted in a paper by Merril Skolnik of the Naval Research Laboratory, Washington, D.C. and entitled *ATTRIBUTES OF THE UBIQUITOUS PHASED ARRAY RADAR*, published 2003 by the IEEE.

FIG. 10 is a simplified block diagram of another system described in the Ehret and McGroary patent application Ser. No. 11/590,402. In the arrangement of FIG. 10, elements corresponding to those of FIG. 9 are designated by like reference numerals. In FIG. 10, a set 912 of arrayed antenna elements includes antenna elements 912a through 912c, each of which is connected to a transceiver/ADC/DAC (TAD) arrangement of a set 1214 of transceiver/ADC/DAC arrangements 1214a through 1214c. Set 912 of antenna elements also includes antenna elements 912d through 912f, which are connected to transceiver/ADC/DAC arrangements 1214d through 1214f, and antenna elements 912g through 912h, which are connected to transceiver/ADC/DAC arrangements 1214g through 1214h. Transceiver/ADC/DAC arrangements 1214a through 1214c, in turn, are connected to a processor $1220_1$ of a set 1220 of processors. In one embodiment, processor $1220_1$ is a programmable gate array used to interface with and route data to and from the individual TADs 1214a through 1214c. Similarly, transceiver/ADC/DAC arrangements 1214d through 1214f, in turn, are connected to a processor $1220_2$ of set 1220, where processor $1220_2$ is likewise a programmable gate array in one embodiment. For completeness of description, transceiver/ADC/DAC arrangements 1214g through 1214h, in turn, are connected to a processor $1220_3$. The remainder of the arrangement of FIG. 10 is equivalent to that of FIG. 9, except that some of the interconnecting digital data paths are identified by alphanumerics. In one version of this embodiment, the number of elemental antennas 912a through 912c is eight, and the number of TADS 1214a through 1214c in subassembly or "blade" $1213_1$ (so called because the physical substrate, not illustrated, is blade-shaped) is eight. Similarly, the number of elemental antennas 912d through 912f is eight, and the number of TADs in blade $1213_2$ is eight. For completeness, the number of antenna elements 912g through 912h is eight, and the number of TADs in blade $1213_N$ is eight. In FIG. 10, the blades of set 1213 of blades are connected to processors of set 1216 of processors (of generalized processor 915) by a set of data paths 1222, and the processors of set 1216 of processors are connected to command processor 918 by a set of data paths 1224. More particularly, blades $1213_1, 1213_2, \ldots, 1213_N$ are connected to processor $1216_2$ by serial data paths $1222_1$, $1222_2, \ldots, 1222_N$, respectively, of set 1222. Processors $1216_1, 1216_2, \ldots, 1216_N$ are connected to command processor 918 by way of serial data paths $1224_1, 1224_2, \ldots, 1224_N$ of a set 1224 of data paths. In the arrangement of FIG. 10, the generalized processor 915 can be viewed as including processor set 1220.

As mentioned, the processors $1220_1, 1220_2, \ldots, 1220_N$ of set 1220 of processors of FIG. 10 interface between their associated transceiver/ADC/DAC arrangements (TADs) of set 1214 and buses or network digital paths $1222_1$, $1222_2, \ldots, 1222_N$ of set 1222 of serial buses. In both transmit and receive modes of operation of the arrangement of FIG. 10, command processor 918 of generalized processor 915 transmits through the distribution network clock data, transmit/receive mode data, and other housekeeping information. In transmit operation of the arrangement of FIG. 10, each processor $1216_1, 1216_2, \ldots, 1216_N$ of set 1216 of processors receives from command processor 918 commands representing the characteristics of the signal to be transmitted and produces or digitally synthesizes eight baseband waveforms which exhibit the characteristics of pulse width, pulse length, and phase and amplitude relative to that of adjacent elements. The synthesized signals in digital form are transmitted over the bus $1222_1$ to field programmable gate array (FPGA) $1220_1$, over bus $1222_2$ to FPGA $1220_2$, and over bus $1222_N$ to FPGA $1220_N$. Field-Programmable Gate Arrays $1220_1$, $1220_2, \ldots, 1220_N$ parse the digital data, convert from serial to parallel form, and route the data to the appropriate one of TADs of set 1214 of TADs. Each TAD then converts the digital data that it receives into analog signal form, and the resulting analog signal is applied to the associated antenna element of set 912 of antenna elements. In one embodiment described in the Ehret and McGroary Patent application, the FPGAs have sufficient processing power to store some of the transmit waveforms in local memory, so that some of the waveforms to be transmitted can be generated locally without involving the higher-level processors of sets 1216 or 918.

The individual transceiver/ADC/DACs (TADs) of set 1214 of FIG. 10 produce analog signal baseband (or possibly IF) frequency to be transmitted from the transmit digital data, and upconvert the analog baseband signal to the frequency established by the control bits from the processors. The upconverted signals are transmitted from each TAD to an associated antenna or transducer for transmission. The transmitted signals propagate from the antenna elements of set 912 and may impinge upon a target, thereby producing return or reflected signals, as known to those skilled in the art. The reflected signals, if any, return to the radar system 910, where the antenna elements $912a, \ldots, 912h$ receive the returned or reflected signals, and couple them to the associated TADs of set 1214. Each TAD of set 1214 of TADs in the reception mode generates a local oscillator signal based on the clock data distributed from command processor 918. Each TAD of set 1214 of TADs downconverts to baseband (or possibly to IF) the signal received by its associated antenna element. The baseband signals are converted to parallel digital form within the TADs. The digital data representing the return signals is or are applied to the gate arrays of set 1220. The gate arrays of set 1220 route the data over the serial buses of set 1222 of buses to the processors of set 1216 of processors. The processors, when receiving return-signal representative data, apply complex weighting functions to the data from each element and coherently sum the data from each element in a particular direction or directions so as to generate directive receive beams. This process is repeated many times per data set, so that in principle an infinite number of beams with unique characteristics can be formed from a single data set from the TADs. The data is also converted into an output form that is made available on a path 1240, to identify the presence or absence of a target and possibly other characteristics of the target(s).

Figure 11:
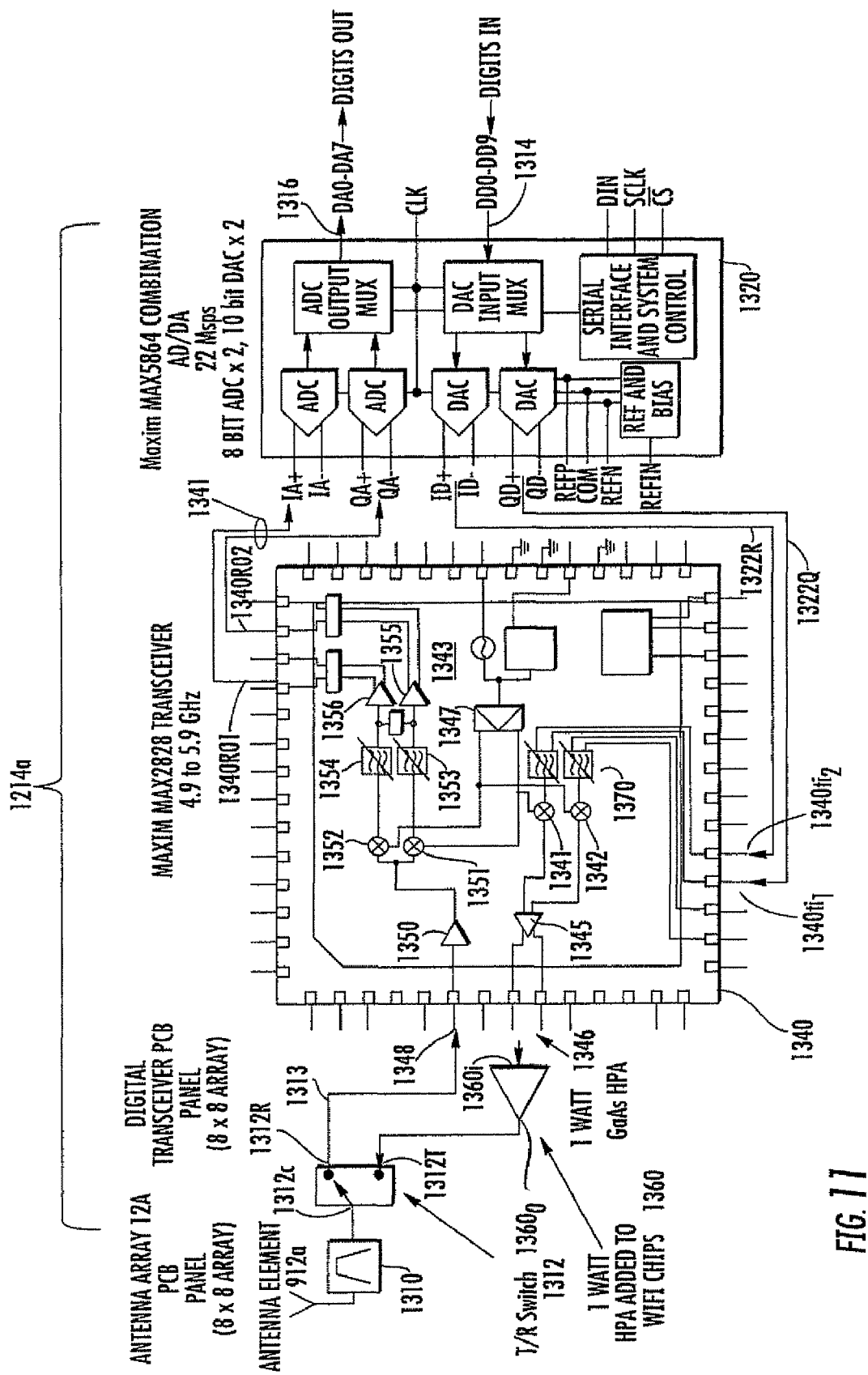
FIG. 11 is a simplified diagram in block and schematic form illustrating a representative single TAD of FIG. 10, and its interconnections with the associated antenna element.

FIG. 11 is a simplified diagram in block and schematic form illustrating a representative single TAD of FIG. 10, and its interconnections with the associated antenna element. For definiteness, antenna element 912a and TAD 1214a are selected as representative. In FIG. 11, TAD 1214a includes an analog bandpass filter 1310 having a port coupled to antenna element 912a. A second port of filter 1310 is connected or coupled to a "common" port 1312c of a single-pole, double-throw transmit/receive switch 1312. Switch 1312 is illustrated by a mechanical switch symbol, as is common for explanatory material. Those skilled in the art realize that solid-state switches are actually used in practice. In the mechanical switch symbol 1312, the common port 1312c is connected to a movable element illustrated as an arrow, which can connect to one of two individual or independent ports. As illustrated, the movable element of switch 1312 is in a position in which the antenna element 912a and filter 1310 are coupled through common port 1312c to a receive port 1312R. In the other position of switch 1312, the common port 1312c is coupled to a transmit switch port 1312T. The transmit or receive state of switch 1312 is controlled digitally with commands originating from command processor 918 of FIG. 9 or 10.

In the arrangement of FIG. 11, digital data representing the analog signals to be transmitted are applied by way of Digits In path 1314 to a clocked combination analog-to-digital and digital-to-analog converter (AD/DA) 1320. In the particular embodiment illustrated in FIG. 11, AD/DA 1320 is a Maxim MAX5864 monolithic mixed-signal integrated circuit (MMIC), which is a commercial off-the-shelf device (COTS). A mixed-signal device operates on both digital and analog signals. The serial digital data to be transmitted is applied to AD/DA 1320, and multiplexed within AD/DA 1320 to produce mutually quadrature-phase data. Two digital-to-analog converters (DACs) separately convert the digital data into analog form. The inphase (I) (or real) and quadrature (Q) (or imaginary) components of the resulting analog signal are generated at analog signal ports ID+ and QD+, and carried on signal paths 1322R and 1322Q, respectively, for application to a solid-state transceiver 1340. In the particular embodiment of FIG. 11, the transceiver 1340 is a Maxim type MAX2828 integrated circuit, also a MMIC COTS device. Both the AD/DA 1312 and transceiver 1340 are commercial off-the-shelf (COTS) items which are designed for Wi-Fi wireless local area network data communications. Wi-Fi is a name coined by the Wireless Ethernet Compatibility Alliance for equipment interoperable with IEEE standard 802.11.

Transceiver 1340 of FIG. 11 has a pair of transmit analog signal input ports 1340ti1 and 1340ti2, which couple the transmit analog signals (by way of antialias filters) to a pair of mixers or multipliers (X) 1341 and 1342. Clock data to establish a frequency reference is or are applied to a phase-lock loop designated generally as 1343. Multipliers 1341 and 1342 also receive reference-frequency signals from phase-lock loop 1343 by way of a phase shifter 1344 to provide the mixers 1341 and 1342 with mutually quadrature reference signals. The application of the reference signals at or near the desired upconverted frequency causes the mixers to operate as upconverters, producing carrier signal modulated by the commanded functions. The upconverted signals produced by mixers 1341 and 1342 are applied to an amplifier 1345, which amplifies the upconverted carrier signal. The amplified upconverted carrier signal appears at a transmit signal output port set 1346 of transceiver 1340. The amplified upconverted carrier signal appearing at output port set 1346 of transceiver 1340 can be amplified, if desired, before application to the transmit individual port 1312T of transmit/receive switch 1312. In the particular embodiment of FIG. 11, a COTS 1-watt amplifier 1360 is coupled to the Wi-Fi transceiver 1340 to provide greater transmit power than that provided by the transmit signal amplifier 1345 of the transceiver integrated circuit 1340. Such an amplifier preferably uses GaAs transistors at the present state of the art.

In operation of the arrangement of a radar system using elements corresponding to that of FIG. 11, the command processor 918 of FIG. 9 or 10 selects the transmission mode, and sets switch 1312 to the transmit mode. Command processor 918 also selects a time for transmission of radar signals, and the various parameters of the signal to be transmitted. The command processor 918 sends digital data representing this information to the lower-level processors, which respond to the commands by generating digital representations of the analog signals to be transmitted, including, if appropriate, a plurality of transmit beams to be formed by the antenna array. The digital data is applied to the digital-to-analog converters (DACs) of AD/DA integrated circuit 1320, which generates the corresponding analog signal. The analog signal to be transmitted is sent to the upconverters 1341, 1342 of transceiver integrated circuit 1340, and amplified by amplifier 1345. The signal from amplifier 1345 is further amplified by power amplifier 1360. The amplified signals from amplifier 1360 are applied through switch 1312 in its transmit mode of operation, through bandpass filter 1310 to the antenna element. Bandpass filter 1310 is selected to suppress unwanted frequency sidebands and components which are artifacts of the upconversion process.

Figure 1:
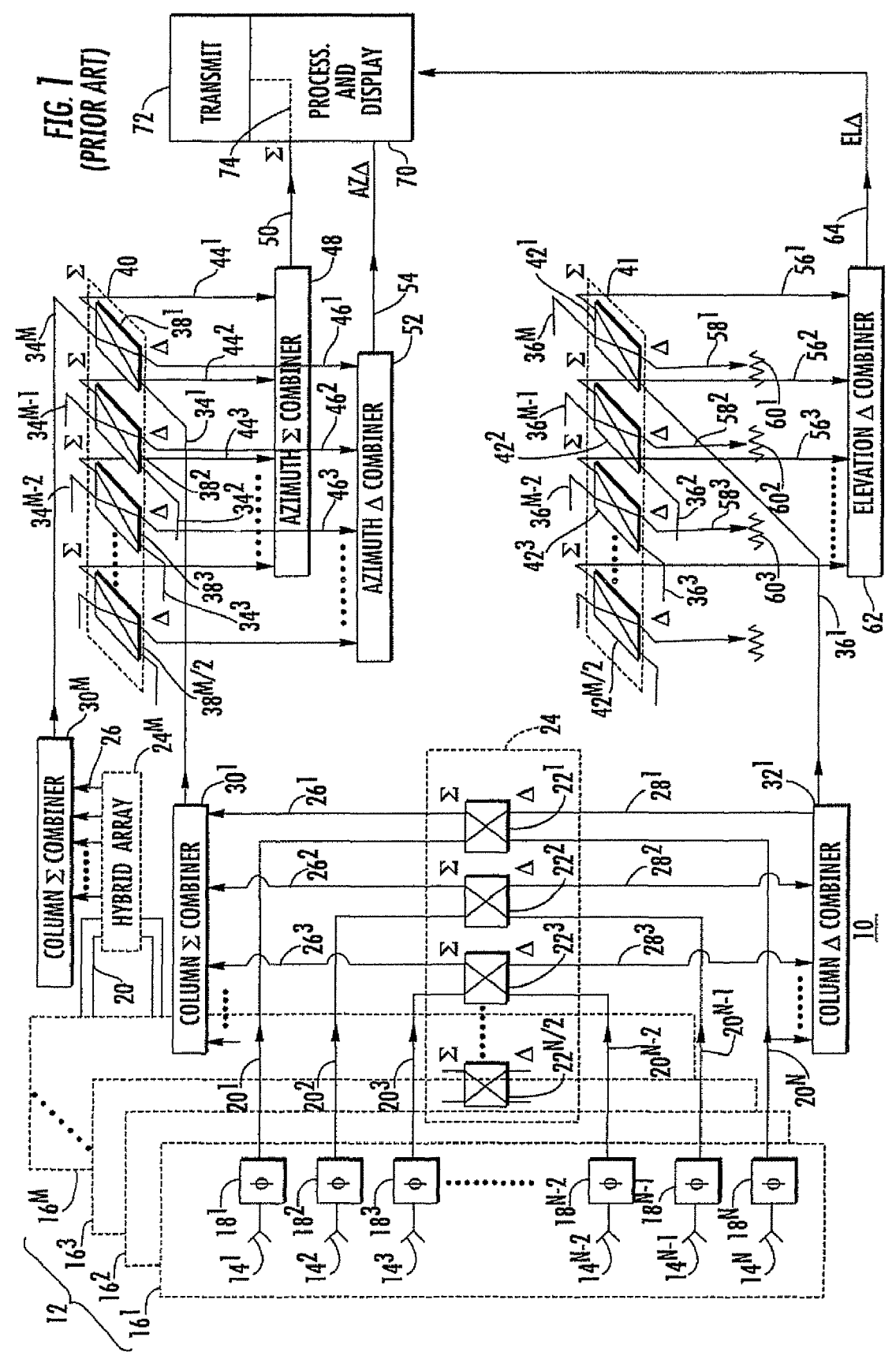
Figure 2A:
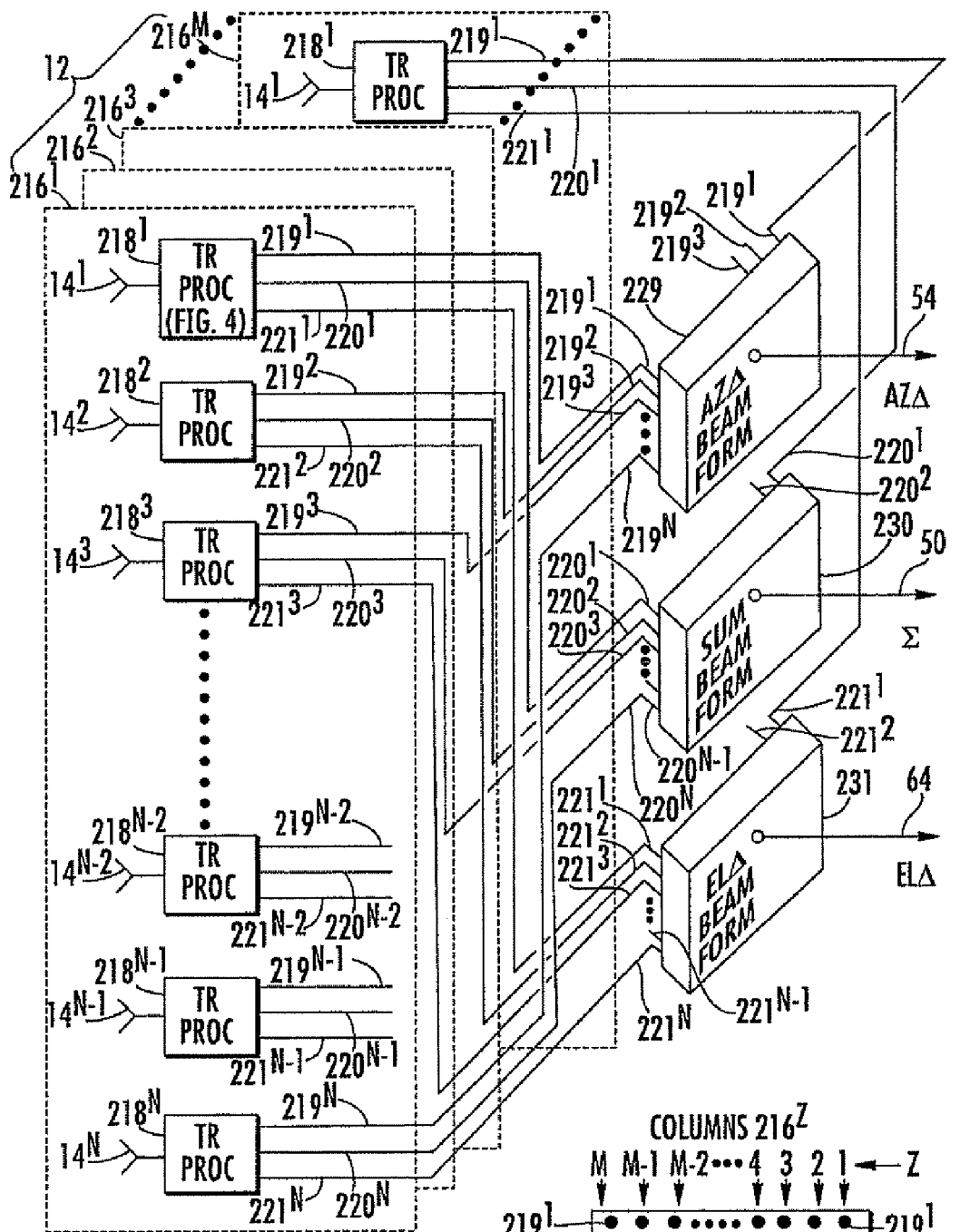
FIG. 2a is a simplified block diagram of a monopulse antenna array arrangement as described by Agrawal et al.
Figure 2B:
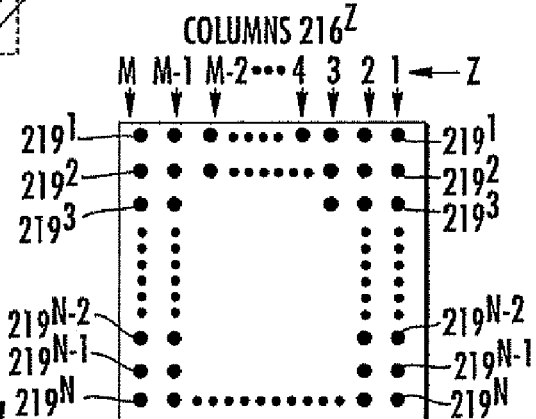
Figure 3:
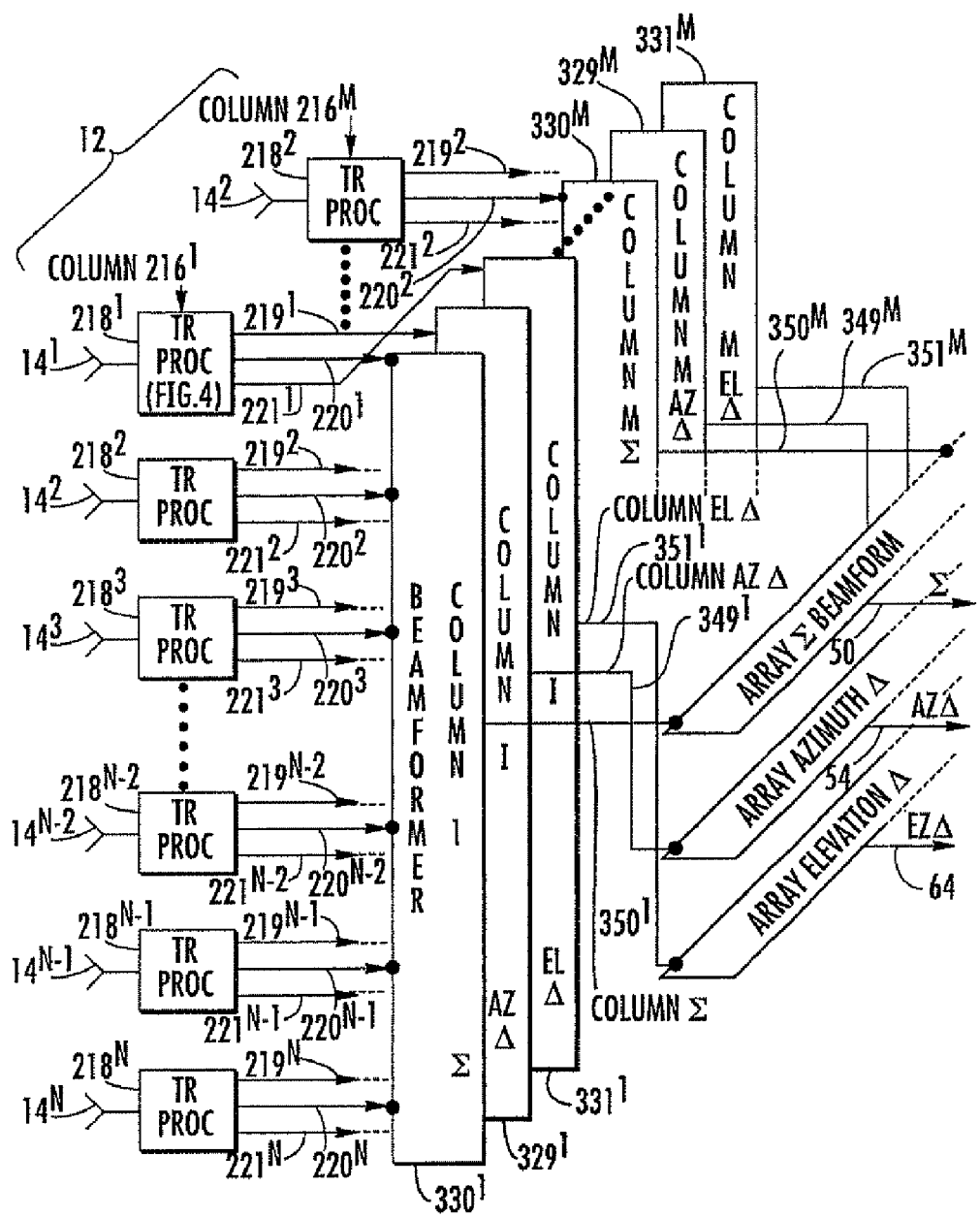
FIG. 3 illustrates one possible interconnection arrangement for the arrangement of FIG. 2a, as set forth in the Agrawal et al. patent.
Figure 4:
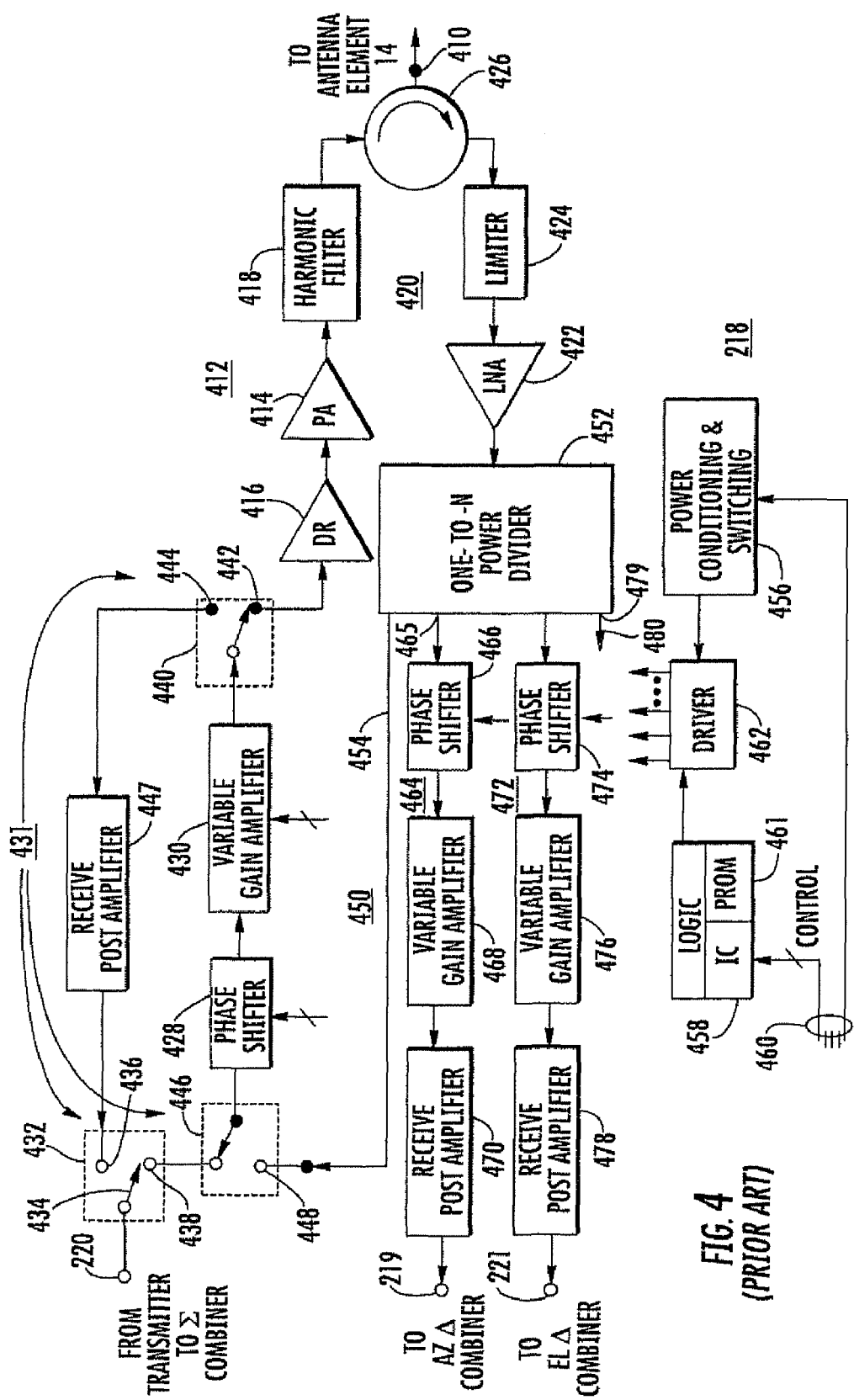
FIG. 4 is a simplified block diagram of a transmit-receive processor which may be used in the arrangements of FIG. 2 or 3.
Figure 5:
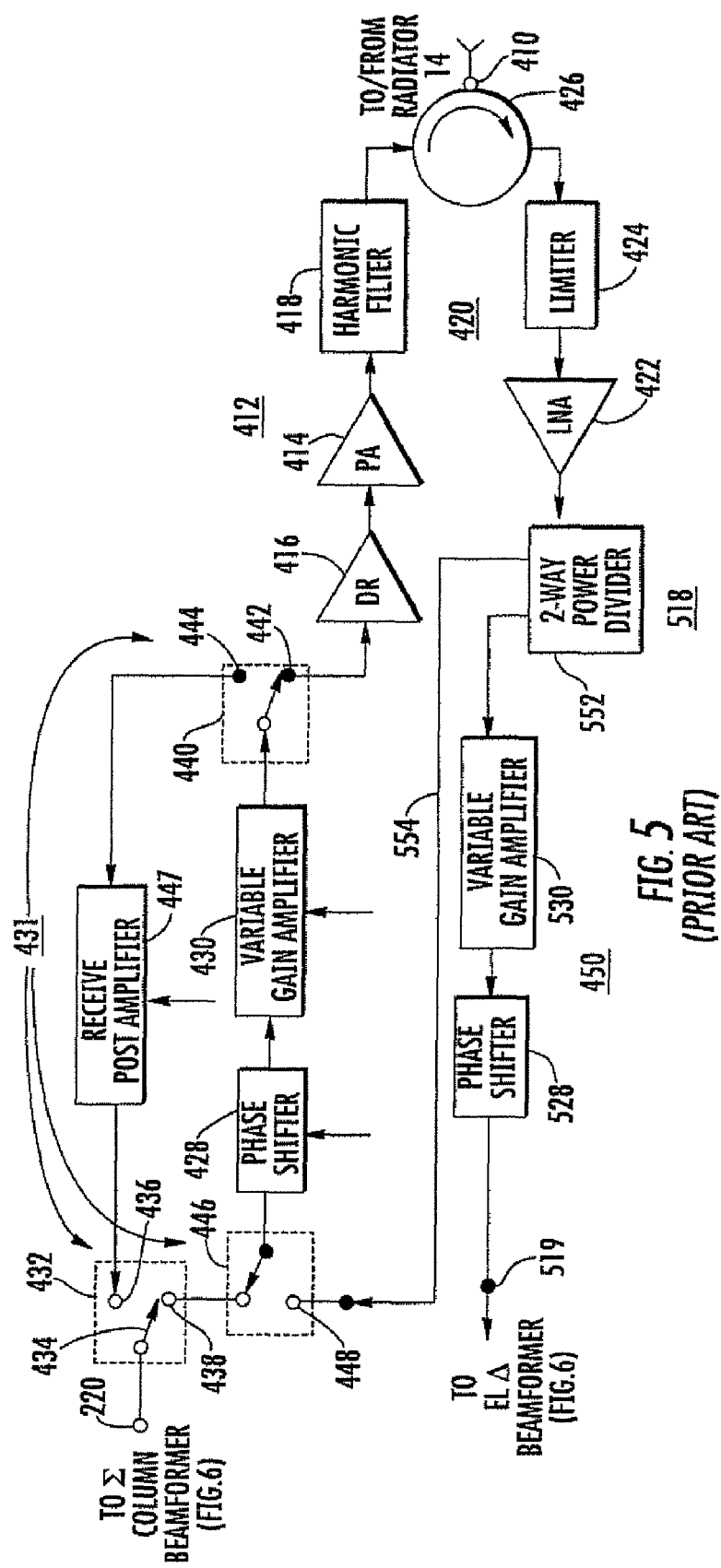
FIG. 5 illustrates portions of the arrangement of FIG. 4.
Figure 6:
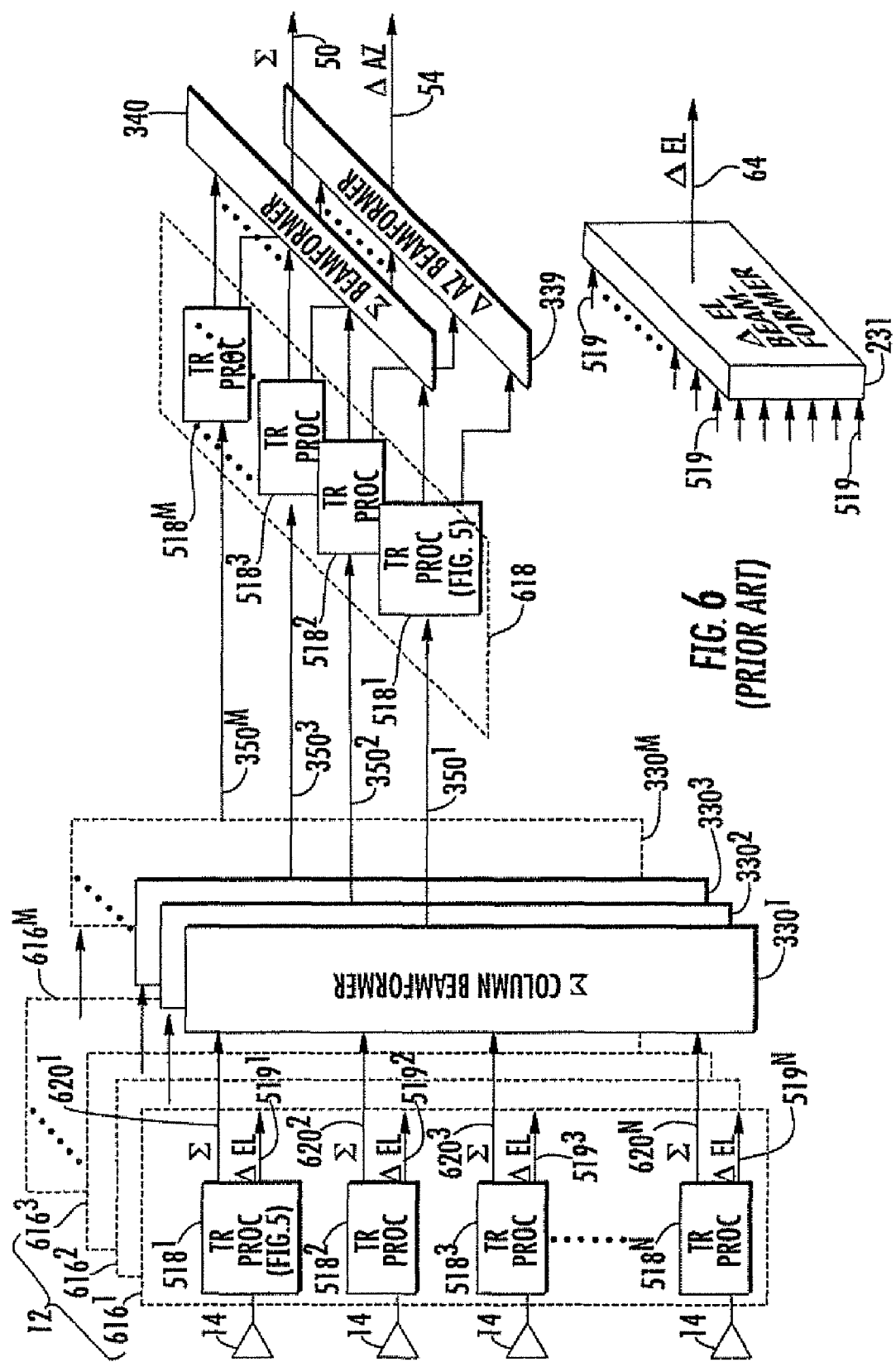
FIG. 6 is a simplified block diagram of an array antenna using two-output TR Proc modules such as those of FIG. 5.
Figure 7:
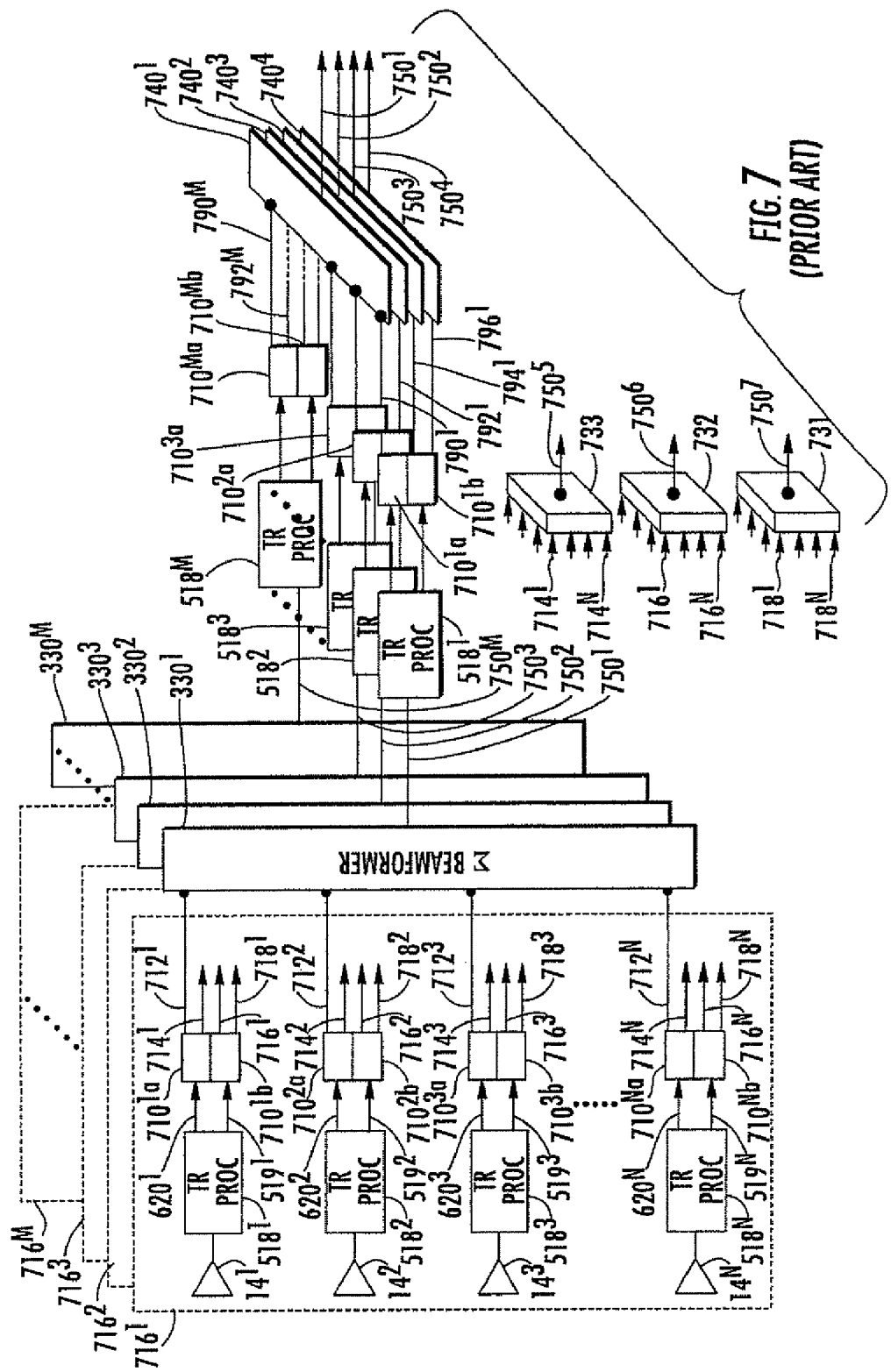
FIG. 7 is generally similar to FIG. 6, but includes the use of power dividers for feeding pairs of beamformers.

The radar system 910 incorporates many structures such as that of FIG. 11. The command processor 918 of FIGS. 1 and 2 establishes the characteristics of the signals which are transmitted from each of the elemental antennas of set or array 912 of antennas, in such a manner as to define the transmit beam or beams and their steering direction, beam width, sidelobe levels, inserted nulls, and the like. The signals transmitted by the various elemental antennas of set 912 of antennas "combine in space" to produce the desired radiation pattern.

In the presence of one or more targets within the transmitted beam of electromagnetic energy, reflections can be expected to occur. When reflections occur, they propagate in various directions, and some of the reflected energy returns to the radar system 910. By the time reflected energy has returned to the radar system, the command processor 918 of FIGS. 1 and 2 will have commanded all of the transmit/receive switches 1312 of FIG. 11 to assume the receive state, in which the common port 1312*c* is coupled to the receive individual port 312R. Returned electromagnetic signal is picked up or received by each of the various antenna elements of set 912, including representative antenna element 912*a* of FIG. 11. The electromagnetic energy received by antenna element 912*a* is coupled through bandpass filter 1310 to the common port 1312*c* of switch 1312, and thence to receive individual port 1312R. From switch 1312, the received signal energy is coupled to a receive signal port 1348 of transceiver 1340.

The received signal energy coupled to receive signal port 1348 of FIG. 11 is applied to the input port of a low-noise amplifier 1350 to produce amplified return or reflected signal. Low-noise amplifier 1350 may be variable-gain. The amplified return signal is applied to a downconverter including multipliers (X) 1351 and 1352. Multipliers 1351 and 1352 also receive the same reference carriers that are applied to upconverter multipliers 1341 and 1342, in the same quadrature relationship. Multipliers 1351 and 1352 downconvert the received signal to produce inphase (I) and quadrature (Q) baseband (or IF frequency) return signals. The downconverted signal may deviate from exact baseband (or IF frequency) as a result of Doppler shifts imposed on the return signal by movement of the target. The I and Q baseband return signals are filtered 1353, 1354 to reduce intermodulation products, and amplified 1355, 1356 to produce baseband analog return I and Q signals at transceiver return signal output ports 1340Ro1 and 1340Ro2.

The baseband analog return I and Q signals at transceiver return signal output ports 1340Ro1 and 1340Ro2 are coupled to analog I and Q signal input ports IA+ and QA+, respectively, of AD/DA 1320. The return analog I and Q signals are individually applied to ADCs of AD/DA 1320, to thereby produce digital signals representing the return analog I and Q signals. The digital data produced by the ADCs of AD/DA 320 are applied to a multiplexer (MUX) for putting the data in serial form for transmission to the next stage of processing.

It is desirable to coherently sum the signals transmitted from the various elemental antennas in the transmission mode of operation, and to coherently sum the received signals, in a manner that defines the desired antenna beams on transmission and reception, respectively. To enable the coherent summation of received signals from all of the array elements, the digital data transmitted from, or received by, each antenna element must be "generated" or processed in a manner that maintains phase alignment of the signals from each element. This is achieved by distributing a reference clock to the transceiver of each element, and more particularly to the phase-lock loop corresponding to 1343 of transceiver 1340 of FIG. 11. In one embodiment of a radar according to an aspect as described in the Ehret and McGroary Patent application, the reference clock is at 160 MHz. This distribution is accomplished, in part, by generating the desired clock signal, or at least digital signals representing the desired clock signal, within command processor 918 of FIG. 10, as for example by means of a CLK generator 918*c*. A distribution network including the data paths of set 1224, processors of set 1216 of processors, and the data paths of set 1222, distributes the clock signal to each blade of set 1213 of blades, and within each blade, provides the clock signal to each transceiver of set 914 of transceivers. The distribution network enables a single reference clock signal to be power divided (or replicated) and distributed to each transceiver with only a small delta phase component from element to element. The transceivers use this signal in a phase lock loop circuit to generate intermediate frequencies which are mixed with RF and baseband frequencies to generate baseband and RF frequencies, respectively.

FIG. 11 and the description herein are simplified to make the main operation clear. Those skilled in the art will understand that the AD/DA 1320 and the transceiver 1340 require power supplies, reference supplies, and various control functions, and other support, and know what to provide and how to provide it.

Figure 12:
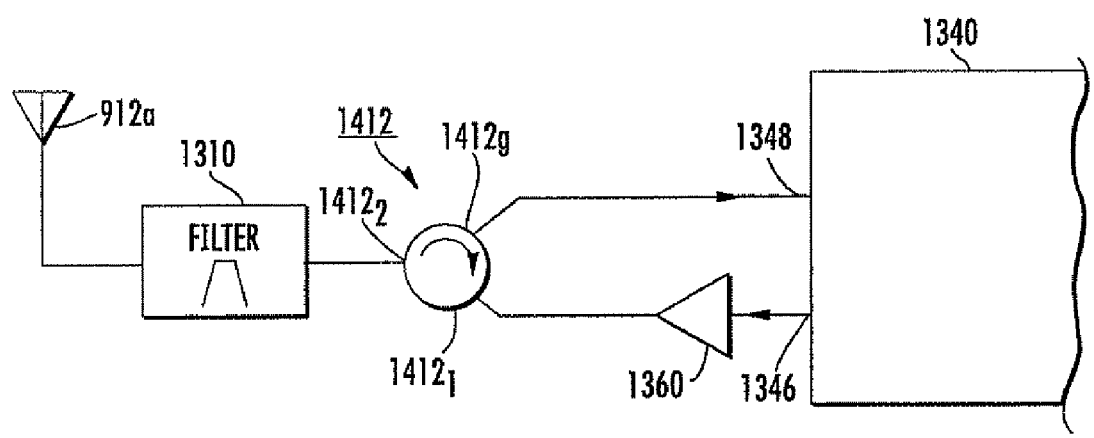
FIG. 12 is a simplified block diagram of a portion of a radar system according to another embodiment of the Ehret and McGroary Patent application.

FIG. 12 is a simplified block diagram of a portion of a radar system according to another embodiment of the Ehret and McGroary Patent application. In the portion of FIG. 12, elements corresponding to those of FIG. 10 are designated by the same alphanumeric. FIG. 12 differs from the arrangement of FIG. 10 in that the transmit/receive switch 1312 is replaced by a circulator 1412. In the arrangement of FIG. 12, circulator 1412 includes a first port $1412_1$, which connects to the output of power amplifier 1360 (or directly to output port 1346 of transceiver chip 1340, if desired). Signals to be transmitted are coupled from amplifier 1360 to port $1412_1$, and are circulated in the direction of the indicating arrow to port $1412_2$. The signals to be transmitted exit port $1412_2$ and flow to the filter 1310 and antenna element 912a. Signals received by antenna element 912a are coupled through filter 1310 to circulator port $1412_2$, and are circulated to port $1412_3$. The received signals exit port $1412_3$ and are coupled to receive signal input port 1348 of transceiver chip 1340. Circulators are well known in the art and require no further description. Use of circulators rather than switches reduces the need to generate and distribute transmit/receive switch control signals.

Figure 13:
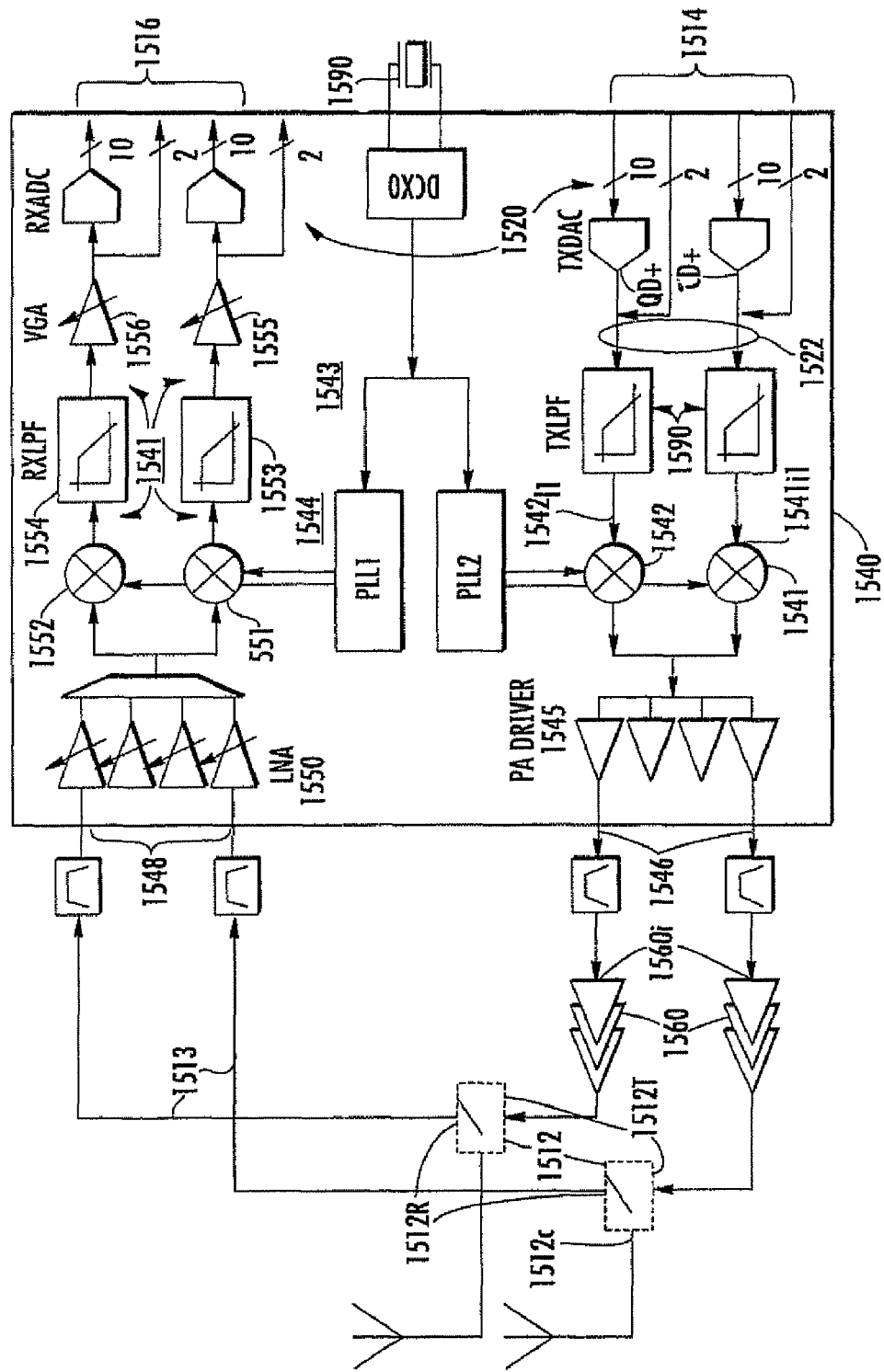
FIG. 13 is a simplified diagram in block and schematic form taken from an application note for COTS type MMIC AA1001 wideband RFIC transceiver.

FIG. 13 is a simplified diagram in block and schematic form taken from an application note for type COTS MMIC AA1001 wideband RFIC transceiver 1540 pursuant to WiMax (IEEE 802.16) standards, and thus is compatible with the 802.11 standard. This solid-state or MMIC transceiver differs from that of FIG. 11 in that it incorporates the digital-to-analog (RXADC) and analog-t0-digital (TXDAC) converters within the same device. This eliminates the need for a separate chip for D/A and A/D. The AA1001 also differs in that it is capable selectively operating at multiple frequency bands. The AA1001 is usable in the same manner as the combination of the Maxim MAX2828 transceiver with the Maxim MAX5864 AD/DA. The salient difference between these two embodiments, of course, is that only one MMIC chip, namely the combined transceiver/AD/DA 1540, is needed to perform all the digital-to-analog processing, transceiving, and analog-to-digital processing. Those skilled in the art will recognize that the AA1001 should receive the reference signal at the DCXO port illustrated as connected to a crystal symbol 1590, and that other modifications may be required. Thus, the arrangement of FIG. 13 may be viewed as including the combined functions of transceiving and AD/DA conversion on a single chip.

Other embodiments are found in the Ehret and McGroary Patent application. For example, while the buses have been described as being serial, they may be parallel, or a mixture of serial and parallel. Where the term "port" or the like is used, it will be understood that multiple connections may be contemplated, as in the case of I and Q components of a signal.

Figure 14:
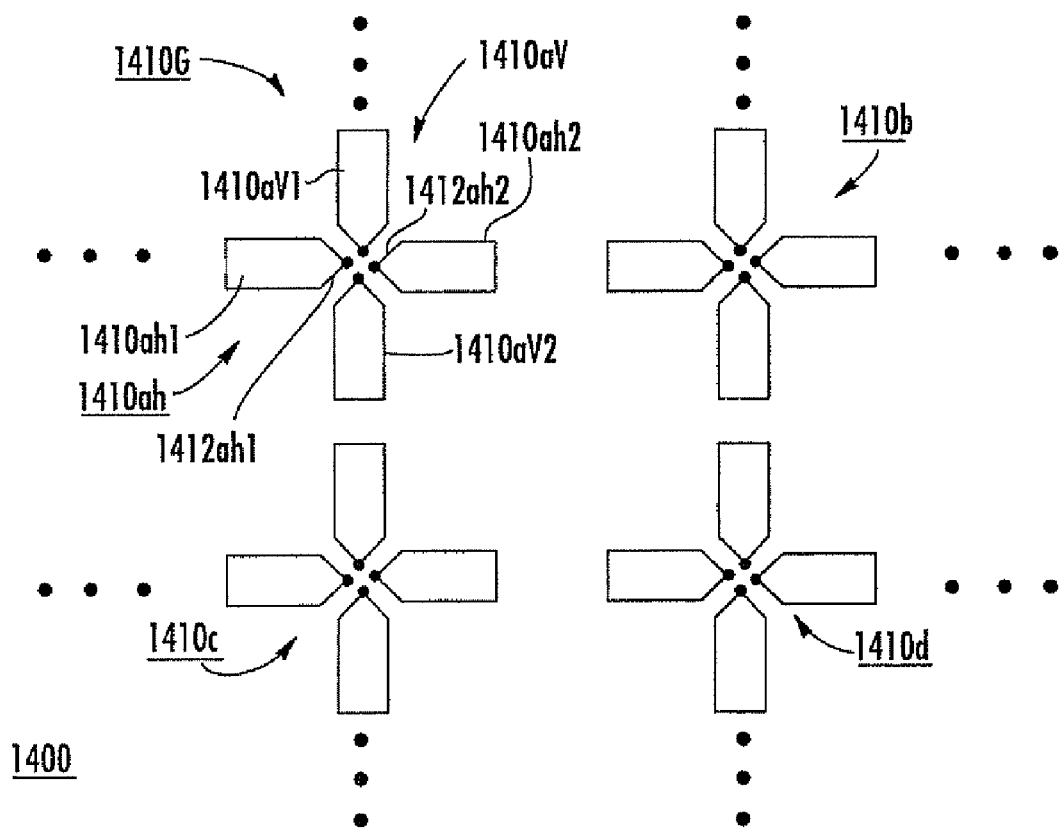
FIG. 14 is a representation of a planar array of planar crossed linearly polarized dipoles.

According to an aspect of the invention, a radar system receives return signals at each antenna element of an array. Each antenna element functionally responds to two mutually orthogonal polarizations of return signal. In practice, it is easiest to have the response be to two mutually orthogonal linear polarizations, rather than to both hands of elliptical or circular polarizations. The simultaneous reception of each of two linear polarizations can be accomplished by co-locating two linearly polarized, mutually orthogonally disposed antenna elements in each elemental cell of an antenna array, and separately coupling the signals of each of the antenna elements. An example of such a pair of mutually orthogonal antenna elements might be a pair of dipoles printed on a planar dielectric support, as suggested in FIG. 14. In FIG. 14, each of the four illustrated elemental antenna locations or cells of the array 1400 is occupied by "crossed dipoles," designated 1410a, 1410b, 1410c, and 1410d. Each crossed dipole comprises two dipole elements. Crossed dipole 1410a is illustrated as including a first "horizontally" (H) disposed dipole element 1410ah including half-dipole elements 1410ah1 and 1410ah2, and "vertically" (V) disposed half-dipole elements 1410av1, 1410av2. Those skilled in the art know that the designations "horizontal" and "vertical" are not necessarily representative of the actual orientation of the antenna elements, but instead are conventional designators. The feed points for each dipole 1410ah and 1410av of FIG. 14 are those points of each half-dipole which is closest to its mating half-dipole. For example, the feed "point" for dipole pair 1410ah is the pair of points 1410ah1 and 1410ah2. Those skilled in the art know how to feed such planar dipole elements from transmission lines embedded in a dielectric support element.

According to an aspect of the invention, element level digital radar techniques similar are applied to provide at least reception of signals in two mutually orthogonal polarizations without the use of complex beamformers for each of the arrays of vertically polarized and horizontally polarized elemental antennas. FIG. 15a is a highly simplified diagram representing a structure used in a transmit part or portion 1500a of a method 1500 for providing polarization diversity upon reception in the context of a weather radar system using element level digital technology corresponding to that of the Ehret and McGroary application. In FIG. 15a, the transmit function 1500a requires transmission of at least one linear polarization 1501 from an antenna array 1510 illustrated as a set 1510a, 1510b, . . . , 1510c of antenna elements. Each of the antenna elements of array 1510 is coupled to a transceiver of a set of transceivers 1540, corresponding in principle to a portion of transceiver 1340 of FIG. 13. More particularly, vertically polarized antenna element 1510a is coupled to transceiver 1540a, vertically polarized antenna element 1510b is coupled to transceiver 1540b, . . . , and vertically polarized antenna element 1510c is coupled to transceiver 1540c. Each transceiver of set 1540 is shown as including symbols for a power amplifier, phase shifter, and low-noise amplifier, but one may understand that only the power amplifier function is used in conjunction with the transmission of signals. The transceivers of set 1540 are coupled to a source of digital transmit (TXMIT) signal 1520, corresponding in principle to a portion of AD/DA 1320 of FIG. 11. In operation of the transmitting function performed by portion 1500a of FIG. 15a, the source 1520 of signals generates digital signals which may be viewed as directly representing a baseband or IF version of the I and Q components of the analog signal to be transmitted. The analog signals are applied from source 1520 to the set 1540 of transceivers, which upconvert and possibly filter and amplify the signal to be transmitted, and the upconverted, amplified, and filtered signal to be transmitted is applied from each transceiver of set 1540 to its own antenna element of set 1510 of antenna elements. More particularly, the upconverted, amplified, and filtered signal to be transmitted is applied from transceiver 1540a of set 1540 to its own antenna element 1510a of set 1510 of antenna elements, the upconverted, amplified, and filtered signal to be transmitted is applied from transceiver 1540b of set 1540 to its own antenna element 1510b of set 1510 of antenna elements, . . . , and the upconverted, amplified, and filtered signal to be transmitted is applied from transceiver 1540c of set 1540 to its own antenna element 1510c of set 1510 of antenna elements. The vertically polarized signal is then broadcast into space with vertical polarization as suggested by arrow 1501, and forms antenna beams in accordance with the analog phase and amplitude imposed by the source digital signals. While the transmission polarization is described as being vertical, it may be any linear polarization.

FIG. 15b is a highly simplified diagram representing a receive part or portion 1500b of a method 1500 for providing polarization diversity upon reception in the context of a weather radar system using element level digital technology corresponding to that of the Ehret and McGroary application. Elements of FIG. 15b corresponding to those of FIG. 15a are designated by like reference numerals. The portion 1500b involves reception of a first polarization of the receive signal by the same antenna array 1510 as that used for transmission by method portion 1500a. In reception, antenna array 1510 is illustrated as receiving vertically polarized signal represented by an arrow 1551. The received signal transduced by the elements 1510a, 1510b, . . . , 1510c of vertical array 1510 travels in a retrograde manner through the set 1540 of transducers of FIG. 15b. More particularly, the signals received by vertically polarized antenna element 1510a are transduced and applied to transceiver 1540a, which low-noise-amplifies the received signal, and downconverts the signal to baseband or IF in preparation for conversion to digital form. The digital signal is applied to receive signal processing illustrated as a block 1520b. It will be noted that the transmit function provided by the transceiver is not used during reception. Similarly, the signals received by vertically polarized antenna element 1510b are transduced and applied to transceiver 1540b for low-noise amplification and for downconversion and conversion to digital form. The resulting digital signal is applied from to receive signal processing block 1520b. For completeness, the signals received by vertically polarized antenna element 1510c are transduced and applied to transceiver 1540c for low-noise amplification and conversion to digital form. The resulting digital signal is applied from to receive signal processing block 1520b. Block 1520b processes the digital signals representing the signals received by each of the antenna elements of set 1510 to define the desired receive beams.

The arrangement of FIG. 15b also includes an array or set 1550 of horizontally polarized antenna elements 1550a, 1550b, . . . , 1550c which are responsive to horizontally polarized receive signals. Horizontally polarized return signal components arise from the vertically polarized transmitted signal due to the characteristics of the target. In the example of a weather radar, the spherical or droplet shape of precipitation results in reflection of some oppositely-polarized signals. The horizontally polarized signals transduced by antenna element 1550a of set 1550 of antenna elements are applied by way of a transceiver 1540a, which low-noise-amplifies, downconverts, and digitizes, to receive processing block 1520b. The signals transduced by antenna element 1550b of set 1550 are applied by way of a transceiver 1540b, which low-noise-amplifies, downconverts, and digitizes, to receive processing block 1520b. Similarly, signals transduced by antenna element 1550c are applied by way of a transceiver 1540c to receive processing block 1520b. Processing block 1520b processes the digitized return signals from horizontally polarized antenna array portion 1550 to define antenna beams which are ideally congruent with the beams defined for the vertical polarization. The digital signals representing the vertically and horizontally polarized return signals in their beams are then made available for further processing associated with the mission of the radar system. One important aspect of this additional processing (not illustrated in FIG. 15b) may include the vector summation of the vertical and horizontal components in known fashion to determine from the polarization components the angle of return linear polarization signals and also the ellipticity of circular components of the return signal. In the context of a weather radar, the additional processing may include the determination of precipitation rates at various ranges from the radar site. In effect, the processing of the digital signals makes it possible to achieve receive polarization agility or diversity. In turn, this polarization agility makes possible determination of the polarization signature of a target.

According to another aspect of the invention, the received vertically polarized signals and received horizontally polarized signals are multiplexed in an alternating fashion, and the alternating samples of vertically and horizontally polarized signals are processed and digitized. This reduces by a factor of two the number of transceivers and DAC/ADCs, assuming that the number of horizontal and vertical elements is the same. In the simplest scheme, alternate digital samples of the received signal represent mutually opposite polarization components. The reception of the vertical and horizontal samples is nominally simultaneous. The sample rate must be sufficient to satisfy the Nyquist criterion. In the context of one embodiment, the digital circuits support up to a 40 MHz sampling rate, so a 2 MHz signal can enjoy 20:1 oversampling.

Figure 16:
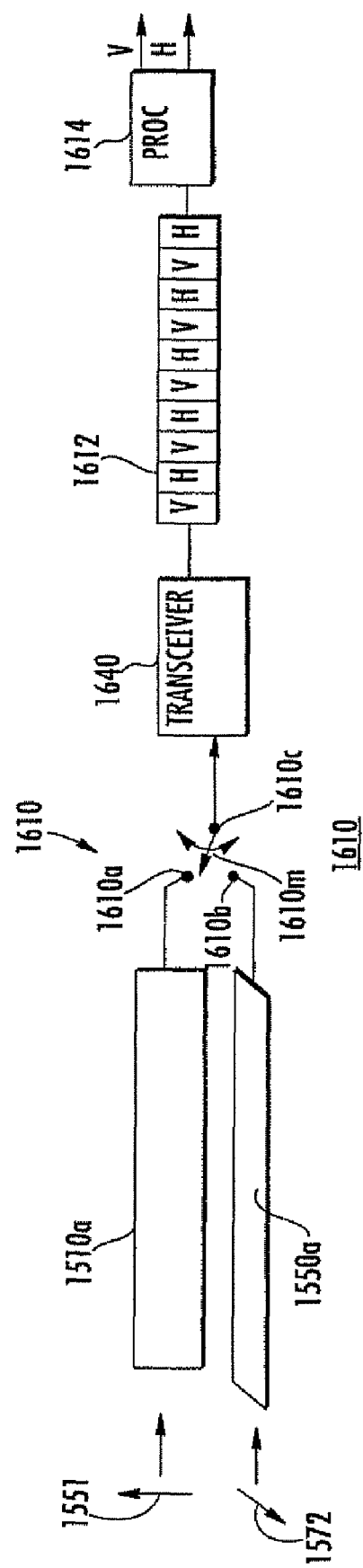
FIG. 16 illustrates the processing associated with one cell of an array antenna according to an aspect of the invention.

FIG. 16 illustrates the processing associated with one cell of an array antenna according to an aspect of the invention. In FIG. 16, vertically polarized components 1551 of a return signal are illustrated as being transduced by a vertically polarized antenna element 1510a, and the horizontally polarized components of the same return signal are illustrated as being transduced by a horizontally polarized antenna element 1550a. The transduced vertical analog components are led from antenna element 1510a to a first individual or independent terminal 1610a of a switch illustrated conventionally as a mechanical single-pole, double-throw switch. The transduced horizontal analog components are led from antenna element 1550a to a second individual terminal 1610b of switch 1610. A "movable" element 1610m is illustrated as alternately connecting a common terminal 1610c to the independent terminals 1610a and 1610b. The alternation of switch 1610 is at a rate such that the Nyquist criterion is fulfilled for the vertical and horizontal components of the analog signal. Analog samples of the transduced signals are alternately applied from common switch terminal 1610c to a transceiver designated 1640. While transceiver 1640 is illustrated in FIG. 16 as being connected only for receive operation, it will be understood that it may also be used for transmission, if desired, but that switch 1610 must be in either the vertical- or horizontal-connecting state during transmission to effectuate linearly polarized transmission at full power. In the receive mode of operation of transceiver 1640 of FIG. 16, the alternating vertical- and horizontal-signal-representative analog signals are low-noise-amplified, downconverted, and digitized, as described in conjunction with FIG. 11 or 13. The digitization of the analog samples must be synchronized with the switching of switch 1610, taking into consideration the group delay through the transceiver and the digitizer. This results in a stream of digital samples on a path 1612 which alternately represent vertical and horizontal received signals. The stream of digital samples is applied to a block 1614 for reconstructing the vertical and horizontal information streams. Thus, a single transceiver (and associated AD/DA) is required to process both the vertical and horizontal signals, which is a saving of half of the transceiver & AD/DA hardware required for the reception function of the system.

Figure 17:
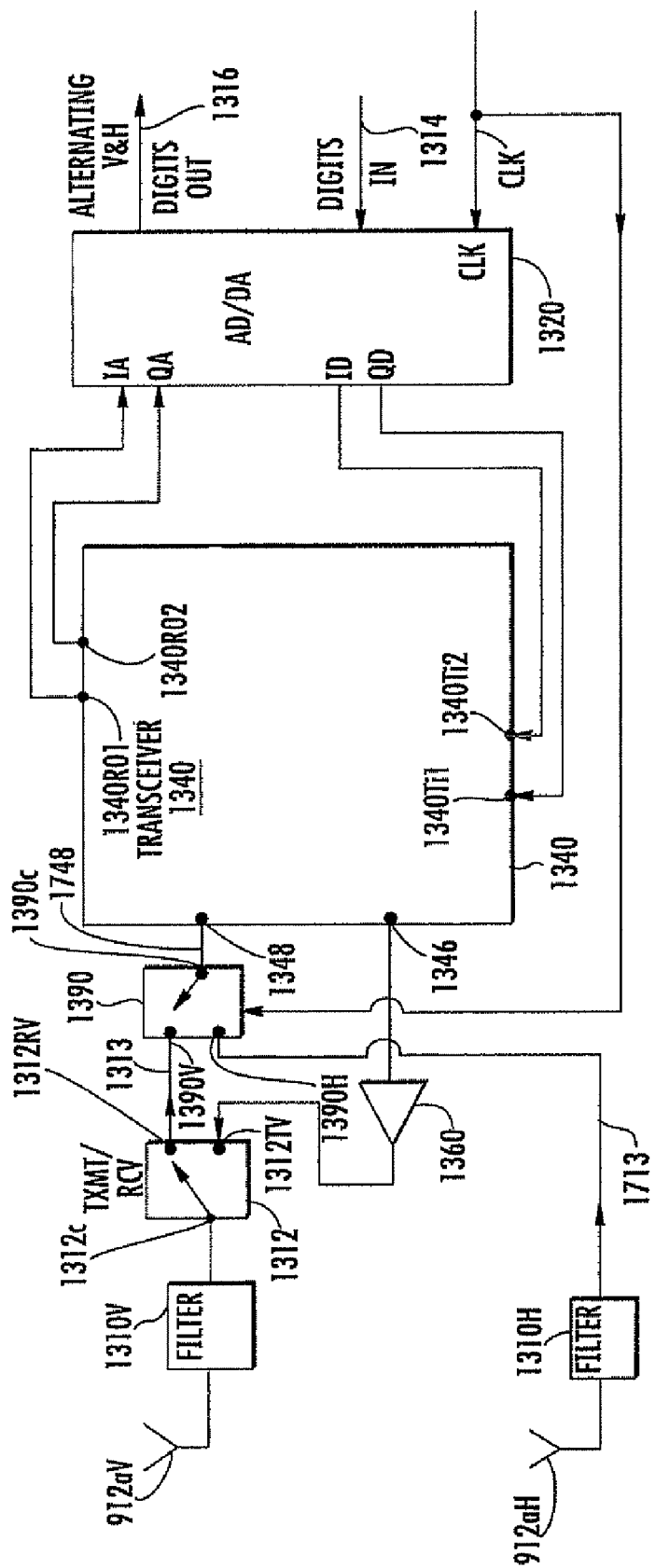
FIG. 17 is a simplified representation of the arrangement of FIG. 13 arranged for transmission of a single polarization and for reception of two mutually orthogonal polarizations, using a single transceiver, according to an aspect of the invention.

FIG. 17 is a simplified representation of the arrangement of FIG. 13 arranged for transmission of a single polarization and for reception of two mutually orthogonal polarizations, using a single transceiver. In FIG. 17, some elements corresponding to those of FIG. 13 are designated by like reference numerals, which may include an appended V or H to indicate that they relate to vertical or horizontal. In FIG. 17, antenna 912aV is a vertically polarized antenna element, which is co-located, inasmuch as possible, with the horizontally polarized antenna element 912aH. It should be kept in mind that the two orthogonally-polarized antenna elements of FIG. 17 are in an array which may include hundreds or thousands of similar antenna elements, so that the structure of FIG. 17 is replicated many times over. As in the case of the arrangement of FIG. 13, a filter 1310V connects antenna 912aV to the common element 1312c of a transmit-receive (TXMT/RCV) switch 1312. A transmit power amplifier 1360 receives transmit signal from transceiver 1340 analog output port 1346, and couples the amplified signals to switch terminal 1312TV when switch 1312 is conditioned for transmission. When conditioned for reception, switch 1312 couples the received signals from its common terminal or port 1312RV by way of a path 1313 to an individual or independent terminal 1390V of a single-pole, double-throw switch 1390. The common terminal or port 1390c of switch 1390 is connected to receive signal input port 1348 of transceiver 1340. Thus, during those intervals in which switch 1312 is conditioned for reception and switch 1390 is conditioned to couple vertically polarized signals, vertically polarized components of the received signal are coupled from antenna 912aV through switch 1312 and through switch 1390 to receive input port 1348 of transceiver 1340.

The arrangement of FIG. 17 also includes a horizontally polarized antenna designated 912aH. Signals received by antenna 912aH are coupled through a filter 1310H and by way of a path 1713 to a second independent or isolated port 1390H of V/H switch 1390. When switch 1390 is conditioned for coupling horizontal signals, the horizontally polarized analog signals received by antenna 912aH are coupled through filter 1310H, and from terminal 1390H to 1390c of switch 1390, and on to receive analog signal port 1348 of transceiver 1340. Switch 1340 is also coupled for switching control in response to the clock signals on the CLK path. Thus, the switching of V/H switch 1390 of FIG. 17 is performed in synchronism with the operation of the ADCs of AD/DA MMIC 1320.

In operation of the arrangement of FIG. 17, digital commands or equivalent waveforms representing the signals for transmission are applied by way of path 1314 to the DACs of AD/DA 1320, which produces analog signals at its output ports ID and QD. These signals are applied by way of ports 1340ti1 and 1340ti2 and ultimately through internal amplifier 1345. The amplified signals for transmission appear at output port 1346, and are amplified by amplifier 1360. With transmit/receive switch 1312 in the transmit mode or condition, the analog signals to be transmitted flow through filter 1310 to the vertically polarized antenna 912aV, and are transmitted. At some later time, when return signals are expected, switch 1312 is conditioned for reception, and switch 1390 is alternately conditioned for coupling vertical (V) or horizontal (H) signal at the AD/DA 1320 clocking rate. During reception (and assuming the presence of target(s)), a stream of analog signals flows from vertically polarized antenna 912aV to independent terminal 1390V of switch 1390, and a stream of filtered signals received by horizontally polarized antenna 912aH flows to independent terminal 1390H of switch 1390. Alternating samples of V and H analog return signals are applied from switch 1390 to analog return signal input port 1348 of transceiver 1340. The internal receiving portions of transceiver 1340 operate on the received V and H samples, to low-noise-amplify, downconvert, and filter the received signals, as described in more detail in conjunction with FIG. 11. The received alternating V and H samples appear at analog output ports 1340Ro1 and 1340Ro2 of transceiver 1340, and are coupled by way of IA and QA input ports of AD/DA 1320 to the ADCs, which convert the received analog signals into digital form. The ADCs of AD/DA 1320 are controlled by a clock signal applied over the CLK path. With the conversion rate of the ADCs of AD/DA 1320 controlled to be coincident with the switching of V/H switch 1390, the digital samples produced by the ADCs of AD/DA 1320 also alternate between representing V received signals and H received signals. The alternating digital V and H received signals appear on output path 1316, and are made available for further processing.

Those skilled in the art will know how to determine the instantaneous polarization from alternating digital samples of V and H, or in general from alternating samples of any two mutually orthogonal polarizations. In particular, the presence and characteristics of circular or elliptical polarization can be determined by processing mutually orthogonal linear polarizations, and the presence and angle of linear polarization can be determined by processing mutually opposite circular or elliptical polarizations. This, in turn, provides for polarization agility on reception, with a much reduced hardware complement by comparison with a transceiver for each polarization at each cell of the antenna array. In one embodiment, the sampling rate for the received signal is expected to be 20 MHz, providing 10 MHz sampling of each of the two receive signal polarization components. This would be five times the NYquist rate for a 2 MHz signal waveform. The described processing is accomplished without the need for complex beamformers to define the beams for each polarization of a dual-polarization array.

FIG. 18 is a simplified diagram similar to FIG. 16, in which I and Q channel samples are used to generate any arbitrary polarization. In FIG. 16, I and Q channel samples are generated with a 90° temporal shift on separate paths illustrated as 1812a and 1812b, respectively. This requires two separate analog-to-digital converters in transceiver 1640, with mutually quadrature clocking. For purposes of explanation, the successive I signal samples in FIG. 18 are designated $I_N$, $I_{N+1}$, . . . , and the successive Q signal samples are designated $Q_N$, $Q_{N+1}$, . . . . An additional processing step illustrated as a block 1814 combines the I and Q components of signal to produce on signal path 1816 a digital representation of the polarized signal which occasioned the I and Q signal components. The processing in block 1814 for the I channel is illustrated by the equations of FIG. 19. The equation for combining the "vertical" (N even) and "horizontal" (N+1 odd) I samples is $$\text{Polarized } I_N = K_V * I_N + K_H * e^{j\theta^*} * I_{N+1} \quad (1)$$

where:
  * represents complex multiplication, and;
  for linear polarization $\phi$ ranging from 0° to 90° as illustrated in FIG. 20, $K_V = \cos \phi$ and $K_H = \sin \phi$, $\theta = 0°$;
  for linear polarization p ranging from 90° to 180° as illustrated in FIG. 20, $K_V = \cos \phi$ and $K_H = \sin \phi$, $\theta = 180°$;
  for right circular polarization, $K_V = 1$, $K_H = 1$, and $\theta = +90°$;
  for left circular polarization, $K_V = 1$, $K_H = 1$, and $\theta = -90°$.

The Q samples are processed in a similar manner to the I samples. The processing for the Q channel uses equations similar to those of FIG. 19. The equation for combining the "vertical" (N even) and "horizontal" (N+1 odd) Q samples is $$\text{Polarized } Q_N = K_V * Q_N + K_H * e^{j\theta^*} * Q_{N+1} \quad (2)$$

where:
  * represents complex multiplication, and;
  for linear polarization $\phi$ ranging from 0° to 90° as illustrated in FIG. 20, $K_V = \cos \phi$ and $K_H = \sin \phi$, $\theta = 0°$;
  for linear polarization $\phi$ ranging from 90° to 180° as illustrated in FIG. 20, $K_V = \cos \phi$ and $K_H = \sin \phi$, $\theta = 180°$;
  for right circular polarization, $K_V = 1$, $K_H = 1$, and $\theta = +90°$;

for left circular polarization, $K_V=1$, $K_H=1$, and $\theta=-90°$. Thus, digital signals can be generated which directly represent any arbitrary polarization of the analog electromagnetic signals received by the antenna arrangement. This information may be used to aid in assessing the nature of a target illuminated by a radar system, as for example by determining the polarization components of a vee-tailed aircraft on a radial trajectory, to determine the type of aircraft. A vee-tailed aircraft should have strong horizontally polarized components from the horizontal wings together with slant −45° components of lesser amplitude from the tail structure, whereas a comparable aircraft with a vertical tail fin would substitute a vertical component for the slant component.

The digital information on path 1816 of FIG. 18 by processor portion 1814 represents the I and Q components of the original analog signal transduced by elements 1510*a* and 1550*a*, including relative time information. This digital information can be processed in a simple manner, as by digital-to-analog conversion in a block 1818, to produce any arbitrary analog signal polarization on an output path 1820.

A method according to an aspect of the invention is for receiving polarized electromagnetic signals. The method comprises the steps of transducing (912*a*V, 912*a*H) two components (V, H) of the received signal to produce first (path 1313) and second (path 1713) streams of analog signals representing mutually orthogonal polarizations of the electromagnetic signals. The first (path 1313) and second (path 1713) streams of analog signals are multiplexed onto a path (1748), to produce multiplexed, interleaved, or alternating analog signals. The multiplexed analog signals (path 1748) are converted from analog to digital form at a sample rate sufficient to allow reconstruction of the original analog signals to thereby generate digital received signals (1320) in which first digital samples representing the first analog signal (V) alternate with second digital samples representing the second analog signal (H). The first ($I_N$, $I_{N+2}$, ... ) and second ($I_{N+1}$, $I_{N+3}$) digital samples of the first and second analog signals, respectively, are processed to produce first and second digital representations of the first and second analog signals, respectively.

A method according to another aspect of the invention is for receiving polarized electromagnetic signals, and comprises the steps of transducing components of the received electromagnetic signal to produce first and second streams of analog signals representing mutually orthogonal polarizations of the electromagnetic signal. The first and second streams of analog signals are multiplexed onto a path, to thereby produce multiplexed, alternating or time-interleaved polarization analog signal samples. The multiplexed analog signals are converted to digital form at a sample rate sufficient to reconstruct the original analog signals, to thereby generate digital received signals in which first digital samples representing the first analog signal alternate with second digital samples representing the second analog signal. The first and second digital samples are processed to generate digital signals representing a selected polarization different from the first and second polarizations.

A method according to another aspect of the invention is for determining the polarization of an electromagnetic signal (1551, 1572), and comprises the steps of transducing the electromagnetic signal with a first antenna element (910*a*V) responsive to a first polarization, to thereby generate a first component of received signal, and transducing the electromagnetic signal with a second antenna element (910*a*H) responsive to a second polarization, to thereby generate a second component of received signal. The first and second components of received signal are multiplexed (1390) at a multiplexing rate (CLK) onto a common path (1748) to thereby generate multiplexed analog received signals. The multiplexed analog received signals in the common path (1748) are at least downconverted, to thereby generate (at ports 1340Ro1, 1340Ro2) processed multiplexed analog received signals. The processed multiplexed analog received signals are converted to digital form (1320) at a rate related to the multiplexing rate (CLK), so that each of first and second components of the multiplexed analog received signals is represented by a digital sample. The digital samples are processed to determine the polarization of the electromagnetic signal. In this aspect of the method of the invention, the multiplexing step may comprise the step of alternately multiplexing to generate alternating analog samples representing the first and second components of the received signal. Also in this aspect of the method of the invention, the step of converting the processed multiplexed analog received signals to digital form at a rate related to the multiplexing rate includes the step of converting the processed multiplexed analog received signals to digital form at the multiplexing rate.

What is claimed is:

1. A method for receiving polarized electromagnetic signals at a system, said method comprising the steps of:

transducing a received polarized electromagnetic signal to produce a first stream of analog signals representing a first polarization of said electromagnetic signal and a second stream of analog signals representing a second polarization of said electromagnetic signal which is orthogonal to the first polarization;

multiplexing, by a multiplexer of the system, said first and second streams of analog signals representing said first and second polarizations;

processing said multiplexed first and second streams of analog signals of said first and second polarizations respectively, with a single receiver of the system;

converting said multiplexed, processed analog signals representing said first and second polarizations to digital form with an analog-to-digital and digital-to-analog converter to generate first digital samples representing said first stream of analog signals representing said first polarization and second digital samples representing said second stream of analog signals representing said second polarization; and processing said first and second digital samples of said first and second streams of analog signals, respectively, to produce first and second digital representations of said first and second streams of analog signals, respectively.

2. The method of claim 1, wherein the step of processing using said single receiver comprises filtering said multiplexed first and second streams of analog signals of said first and second polarizations, respectively.

3. A method for receiving polarized electromagnetic signals at a system, said method comprising the steps of:

transducing a received signal to produce a first stream of analog signals representing a first polarization of said electromagnetic signal and a second stream of analog signals representing a second polarization of said electromagnetic signal which is orthogonal to the first polarization;

multiplexing or interleaving, by a multiplexer of the system, said first and second streams of analog signals representing said first and second polarizations;

processing said multiplexed or interleaved first and second streams of analog signals of said first and second polarizations, respectively, with a single receiver of the system;

converting said multiplexed or interleaved, processed analog signals representing said first and second polarizations to digital form with an analog-to-digital and digital-to-analog converter to generate first digital samples representing said first stream of analog signal signals representing said first polarization and second digital samples representing said second stream of analog signals representing said second polarization; and processing said first and second digital samples to generate digital signals representing a selected polarization which is different from said first and second polarizations.

4. The method of claim 3, wherein the step of processing using said single receiver comprises amplifying said multiplexed first and second streams of analog signals of said first and second polarizations, respectively.

5. A method for creating arbitrarily polarized versions of an electromagnetic signal at a system, said method comprising the steps of:

transducing said electromagnetic signal with a first antenna element responsive to a first polarization, to generate a first stream of analog signals of said first polarization;

transducing said electromagnetic signal with a second antenna element responsive to a second polarization, to generate a second stream of analog signals of said second polarization;

multiplexing, by a multiplexer of the system, said first and second streams of analog signals of said first and second polarizations, respectively at a multiplexing rate;

downconverting said multiplexed first and second streams of analog signals of said first and second polarizations, respectively, with a single receiver of the system;

converting said multiplexed downconverted first and second streams of analog signals of said first and second polarizations, respectively, to digital form with an analog-to-digital and digital-to-analog converter so that each of said first and second polarizations of said multiplexed first and second streams of analog signals is represented by a digital sample; and processing said digital samples to create arbitrarily polarized versions of said electromagnetic signal.

6. The method according to claim 5, wherein said step of multiplexing comprises the step of alternately multiplexing to generate alternating analog samples representing said first and second polarizations of said first and second streams of analog signals.

7. The method according to claim 5, wherein said step of converting is performed at said multiplexing rate.

8. The method according to claim 5, wherein said step of processing said digital samples to create said arbitrarily polarized versions of said electromagnetic signal includes the step of complex multiplication.

9. A system for creating arbitrarily polarized versions of an electromagnetic signal, said system comprising:

a first antenna element for generating a first stream of analog signals of a first polarization;

a second antenna element for generating a second stream of analog signals of a second polarization;

a switch for multiplexing said first and second streams of analog signals of said first and second polarizations, respectively at a multiplexing rate;

a single transceiver for downconverting said multiplexed first and second streams of analog signals of said first and second polarizations, respectively;

an analog-to-digital and digital-to-analog converter for converting said downconverted, multiplexed first and second streams of analog signals of said first and second polarizations, respectively, to digital form so that each of said first and second polarizations of said multiplexed first and second streams of analog signals is represented by a digital sample; and a processor for processing said digital samples to create arbitrarily polarized versions of said electromagnetic signal.

10. The system according to claim 9, wherein said switch generates alternating analog samples representing said first and second streams of analog signals of said first and second polarizations, respectively.

11. The system according to claim 9, wherein said analog-to-digital and digital-to-analog converter converts at said multiplexing rate.

12. The system according to claim 9, wherein said processing performed by said processor includes complex multiplication.

13. The system according to claim 9, wherein the first and second antenna elements are orthogonally-polarized antenna elements.

* * * * *